(12) United States Patent
Kume et al.

(10) Patent No.: US 6,819,868 B2
(45) Date of Patent: Nov. 16, 2004

(54) CAMERA

(75) Inventors: Hideaki Kume, Tokyo (JP); Giichi Kaneta, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/308,937

(22) Filed: Dec. 3, 2002

(65) Prior Publication Data

US 2003/0133706 A1 Jul. 17, 2003

(30) Foreign Application Priority Data

Dec. 5, 2001 (JP) ........................................ 2001-371736
Dec. 28, 2001 (JP) ........................................ 2001-401829

(51) Int. Cl.⁷ ........................ G03B 17/20; G03B 13/02; G03B 13/08; G03B 17/02; H04N 5/222
(52) U.S. Cl. ........................ 396/296; 396/374; 396/375; 396/384; 396/386; 396/540; 348/333.06; 348/333.09
(58) Field of Search ................................. 396/177, 178, 396/373, 374, 375, 378, 379, 381, 384, 385, 386, 540, 541, 296, 84, 141, 148; 348/333.01, 333.06, 333.08, 333.09, 341, 207.99; 358/906, 909.1

(56) References Cited

U.S. PATENT DOCUMENTS 5,066,967 A * 11/1991 Yamamoto et al. ......... 396/177

6,393,222 B1 * 5/2002 Nakagawa et al. ......... 396/287
6,483,542 B1 * 11/2002 Morinaga ............... 348/333.06

FOREIGN PATENT DOCUMENTS

| JP | 11-243499 A | 9/1999 |
| JP | 2001-094845 A | 4/2001 |
| JP | 2001-305646 | * 11/2001 |
| JP | 2001-311997 | * 11/2001 |

* cited by examiner

Primary Examiner—David Gray
Assistant Examiner—Rochelle Blackman
(74) Attorney, Agent, or Firm—Frishauf, Holtz, Goodman & Chick, P.C.

(57) ABSTRACT

A camera is provided that includes a camera housing and a TFT panel, which permits verification of a formed image, located on the back of the camera housing. A strobe unit and an electronic viewfinder unit are located in the upper part of the camera housing. The electronic viewfinder unit has a unit body including: a TFT panel permitting viewing of an object image; an eyepiece opposed to the back of the camera housing and used to view the object image displayed on the TFT panel; and a prism serving as an optical path conversion member that bends by a predetermined angle light emitted from an object image displayed on the TFT panel so as to route the light to the eyepiece, and adjoining the TFT panel and the eyepiece.

17 Claims, 16 Drawing Sheets

DIRECTION OF PHOTOGRAPHER

TO STROBE CIRCUIT ns. 2001-371736 filed in Japan on Dec. 5, 2001, and
CAMERA

This application claims the benefit of Japanese Applications No. 2001-371736 filed in Japan on Dec. 5, 2001, and No. 2001-401829 filed in Japan on Dec. 28, 2001, the entire contents of which are incorporated herein by reference.

BACKGROUND OF THE INVENTION

1. Field of the Invention

The present invention relates to a camera having a so-called electronic viewfinder in which a liquid crystal display element is incorporated, or a camera having a liquid crystal display. More particularly, the present invention relates to the location and structure of the electronic viewfinder in the camera, and the structure for bearing the liquid crystal display and the location of the liquid crystal display.

2. Description of Related Art

In recent years, a demand for a so-called digital camera that records and reproduces an object image that is converged by an imaging optical system and then formed by a CCD (charge-transfer imaging device) has increased along with the prevalence of electronic equipment including a personal computer.

In this type of digital camera, the CCD forms an object image converged by the imaging optical system so as to produce a video signal. Based on the image signal, the object image is displayed on a display such as an LCD (liquid crystal display) so that a photographic scene can be verified. In the past, there has been a great demand for a compact and power-saving camera.

A digital camera has been requested to have the capability of a viewfinder, in order to check an image during photography. Moreover, inclusion of a large-sized display is preferred in order to view a recorded photographic image.

Moreover, the capability of a viewfinder can be, as already known, realized with an optical viewfinder or an electronic viewfinder.

However, when the capability of a viewfinder is realized by using an optical viewfinder, if a photographic lens is a zoom lens, a mechanism for interlocking the viewfinder with the photographic lens is complex. This makes it hard to realize a compact and thin camera. Moreover, a viewfinder of a single-lens reflex type may be constructed. In this case, the position of the viewfinder relative to a photographic lens is restricted. The restriction leads to a critical condition that must be satisfied for the pursuit of a compact camera.

FIG. 20 is a longitudinal sectional view showing an example of a conventional camera in which the capability of a viewfinder is realized with inclusion of an electronic viewfinder.

As shown in FIG. 20, a camera 100 of this type has a photographic lens 102, a control circuit board 103, a liquid crystal display (hereinafter, a TFT panel) 104, an electronic viewfinder unit 105, and a power circuit board 107 included inside a camera armor 101 forming a camera housing.

In general, the photographic lens 102 is located in the lower part of the inside of the camera armor 101. The photographic lens 102 picks up an object image using the optical system and converges the image light on an imaging device such as a CCD mounted on the control circuit board 103. The control circuit board 103 is located near the back of the camera armor 101. Optical members including the CCD, various electronic parts, and a signal processing circuit for converting the imaging light into a video signal are mounted on the control circuit board 103.

Behind the control circuit board 103 is a first TFT panel 104, on which a formed image is displayed, so that the display surface thereof will be bared on the back of the camera armor 101.

On the other hand, the electronic viewfinder unit 105 has the capability of a viewfinder to permit viewing of an object image during photography. The electronic viewfinder unit 105 includes at least a second TFT panel 106 on which a formed image or an object image is displayed, and an eyepiece 105a through which the image displayed on the second panel TFT is viewed. The electronic viewfinder unit 105 is located in the upper part of the inside of the camera armor 101. The power circuit board 107 for strobe lighting or the like is interposed between the electronic viewfinder unit 105 and the photographic lens 102.

The first TFT panel 104 and control circuit board 103 are electrically connected to each other via a connector 108b formed on the control circuit board 103 and a flexible circuit board 104a. Moreover, the second TFT panel 106 and control circuit board 103 are electrically connected to each other via a flexible circuit board 106a routed from below the electronic viewfinder unit 105 and a connector 108a mounted on the back of the control circuit board 103.

As mentioned above, in the structure attempting to realize the capability of a viewfinder with inclusion of an electronic viewfinder, unlike a camera structured to have an optical viewfinder and a zoom lens, the position of the electronic viewfinder within the camera is not restricted and a complex interlocking mechanism such as a zooming mechanism is not included. However, in the camera 100 shown in FIG. 20, a predetermined optical length must be ensured for light traveling between the second TFT panel 106 and eyepiece 105a included in the electronic viewfinder unit 105. The illustrated space is occupied, causing a critical obstacle to realization of a thin camera.

When the capability of a viewfinder is realized with inclusion of an optical viewfinder, if a zoom lens is included, it is hard to realize a compact and thin design for conventional cameras because of a complex mechanism for interlocking the viewfinder with a photographic lens. A single-lens reflex type viewfinder may be constructed. However, in this case, the position of the viewfinder relative to the photographic lens is restricted, and this restriction becomes a critical condition that must be satisfied in pursuit of a compact camera. It is therefore hard to realize a compact and thin camera. Otherwise, the capability of a viewfinder may be realized with inclusion of an electronic viewfinder. In this case, a complex interlocking mechanism such as a zooming mechanism is not included and the position of the viewfinder in a camera housing is not restricted. Nevertheless, an electronic viewfinder unit cannot be, like the one included in the aforesaid conventional camera, made small in size. It is therefore hard to realize a compact and thin camera.

A viewfinder unit in accordance with a similar related art has been proposed in, for example, Japanese Unexamined Patent Application Publication No. 11-243499. According to the related art, the viewfinder unit can be made smaller in size and incorporated in a compact video camera or the like.

The proposed viewfinder unit has a plurality of electronic circuit boards locked in a lens holder that is a space created behind a mirror which bends the ray axis of video light traveling from a liquid crystal display panel. The circuit boards are realized with flexible circuit boards, and can therefore be efficiently stored in a narrow space though the circuit boards require a large area. This contributes to realization of a compact camera. However, the above proposal refers to the structure for bending image light coming from the liquid crystal display panel at right angles. Mere adoption of the structure does not lead to realization of a compact and thin camera. A comprehensive idea taking a large-sized display to be located on the back of a camera into consideration realizes a satisfactorily compact and thin design. In a current situation, when the capability of a viewfinder is realized with inclusion of an electronic viewfinder, a camera cannot be designed compactly and thinly.

On the other hand, many conventional digital cameras have a liquid crystal display, which has the capability of a viewfinder, located on the back of a camera. While an object image displayed on the liquid crystal display is viewed, photography can be achieved. However, as far as high-angle or low-angle photography is concerned, an optimal angle of visibility at which an image displayed on the liquid crystal display is optimally visible may be exceeded and a display image may be hard to see. Moreover, the display image may be hard to see because of reflected sunlight.

In efforts to solve the foregoing problems, various proposals have been made in the past. For example, a digital camera has been proposed in Japanese Unexamined Patent Application Publication No. 2001-94845.

The proposed digital camera includes a turning mechanism enabling adjustment of an angle of opening or closing at which a liquid crystal display is opened or closed relative to a camera body. Moreover, the digital camera includes a light source that irradiates light to the liquid crystal display via a directive member. In the digital camera, the visibility of an image displayed on the liquid crystal display can be readily ensured, and the camera can be handled irrespective of the visibility. Therefore, the camera can offer improved maneuverability.

However, in the digital camera described in Japanese Unexamined Patent Application Publication No. 2001-94845, the liquid crystal display having the turning mechanism is handled directly in order to adjust the angle of opening or closing at which the liquid crystal device is opened or closed relative to the camera body. Using this means, every time a composition of a photograph is changed, the camera held with both hands must be released in order to directly handle the liquid crystal display. Therefore, a photographer may miss a shutter chance. Moreover, it is hard to perform high-angle or low-angle photography or to proceed with photography while changing a composition of a photograph.

SUMMARY OF THE INVENTION

Accordingly, the present invention attempts to solve the foregoing problems. The present invention provides a camera that has a viewfinder which employs a liquid crystal display, or a so-called electronic viewfinder incorporated therein, and which can be designed compactly and thinly by adopting a simple structure. The present invention also provides a camera having a liquid crystal display, and offering excellent maneuverability while being held with both hands. The camera can be designed compactly owing to adoption of a simple structure. A camera according to one aspect of the present invention consists mainly of: a display member on which an image of an object is displayed; an eyepiece located along the back of a camera housing and used to view an image displayed on the display member; and an optical path conversion member adjoining said display member and said eyepiece, and bending substantially 180° light emitted from an image displayed on the display member so as to route the light to the eyepiece. A user can view an image of an object displayed on the display member through the eyepiece.

A camera in accordance with another aspect of the present invention consists mainly of: a first display member which is located substantially parallel to the bottom of a camera housing and on which an image of an object is displayed; an eyepiece located along the back of the camera housing and used to view the image displayed on the first display member; an optical path conversion member that adjoins the first display member and eyepiece, and that bends substantially 90° light emitted from an image displayed on the first display member so as to route the light to the eyepiece; a second display member located along the back of the camera housing; and a circuit board interposed between the first display member and second display member and connected to both the first and second display members. A user views the image of the object displayed on the first display member through the eyepiece. Furthermore, the user can view an image displayed on the second display member.

A camera in accordance with still another aspect of the present invention consists mainly of: a display means that is selectively set to a first state in which the display means is located substantially parallel to the back of the camera and a second state in which the display means is tilted relative to the substantially parallel state, and on which an object image passed through an imaging lens is displayed; and an operating member for use in selecting the first state or the second state. The operating member can be handled with the camera held.

The other features of the present invention and the advantages thereof will be apparent from the description below.

DETAILED DESCRIPTION OF THE PREFERRED EMBODIMENTS

Figure 1A:
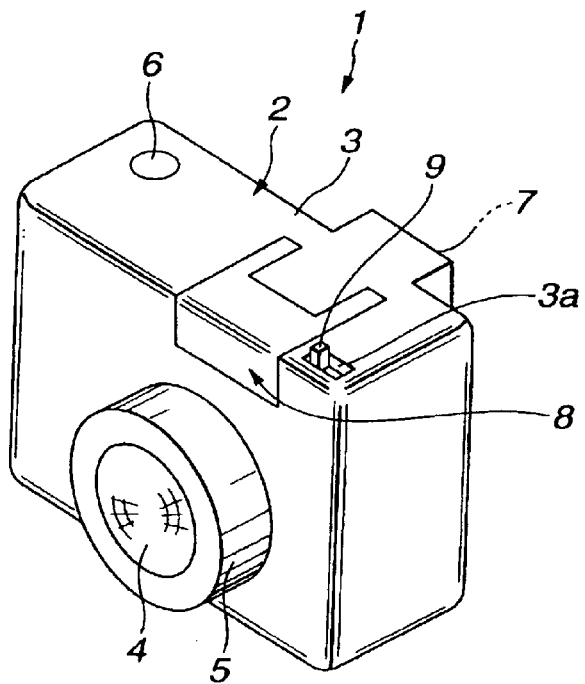
FIG. 1A is a perspective view showing the appearance of a camera in accordance with a first embodiment of the present invention which is seen from the front and whose strobe is stored.

Referring to the drawings, embodiments of the present invention will be described below.

Figure 1B:
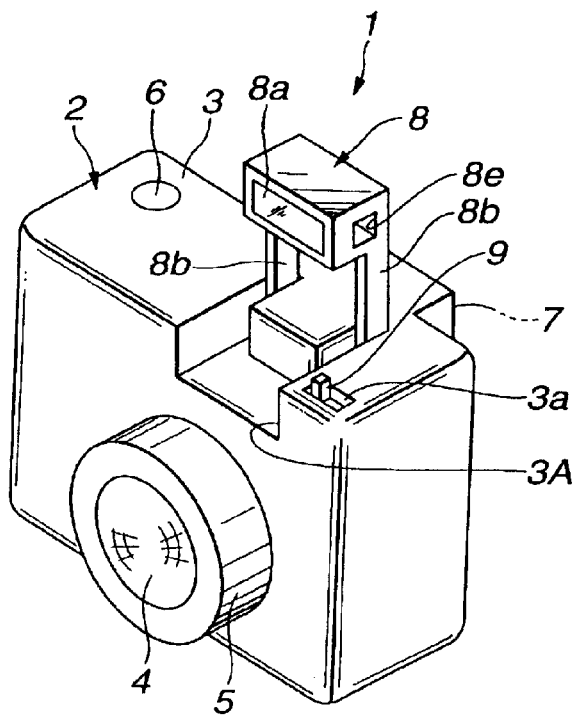
FIG. 1B is a perspective view showing the appearance of the camera in FIG. 1A which is seen from the front and whose strobe is driven.
Figure 2:
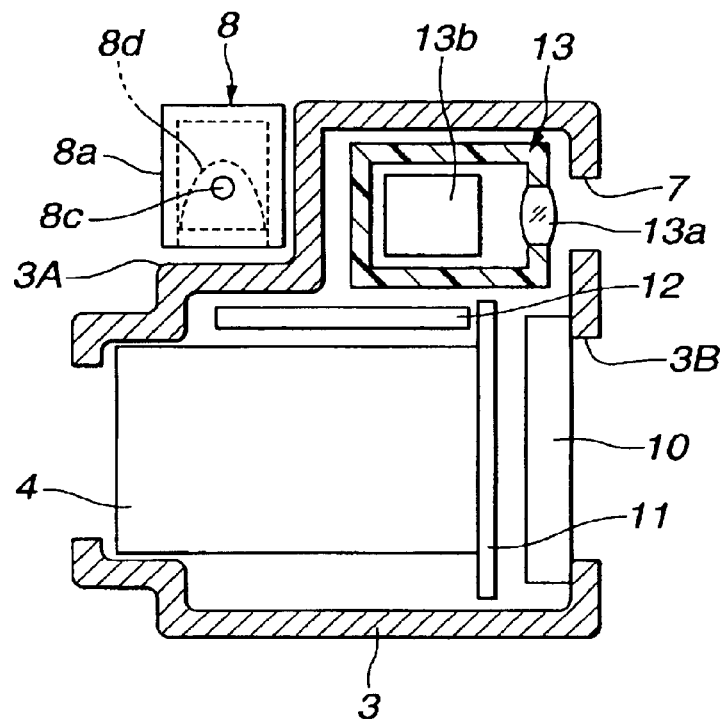
FIG. 2 is a sectional view showing the layout of components of the camera shown in FIG. 1A.
Figure 3:
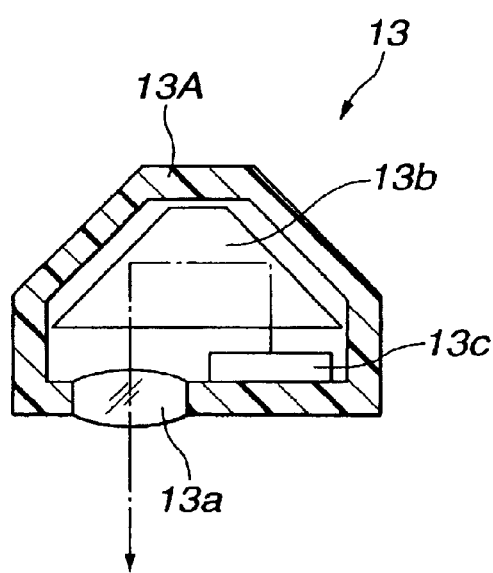
FIG. 3 is a sectional view schematically showing the components of an electronic viewfinder unit included in the camera shown in FIG. 1A.
Figure 4A:
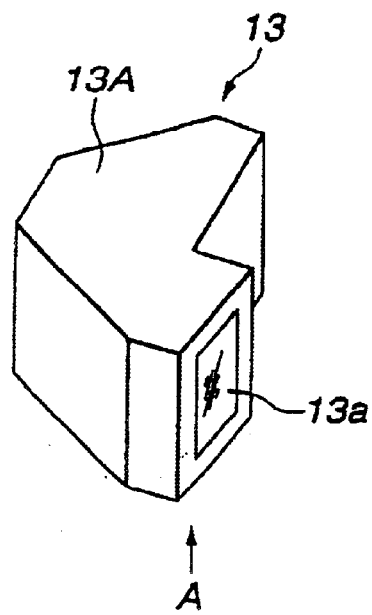
FIG. 4A is a perspective view showing the appearance of the electronic viewfinder unit shown in FIG. 3.
Figure 4B:
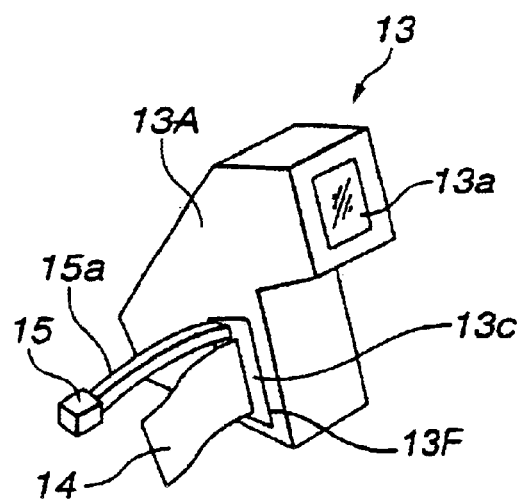
FIG. 4B is a perspective view showing the appearance of the electronic viewfinder unit shown in FIG. 3 seen in a direction of arrow A.
Figure 4C:
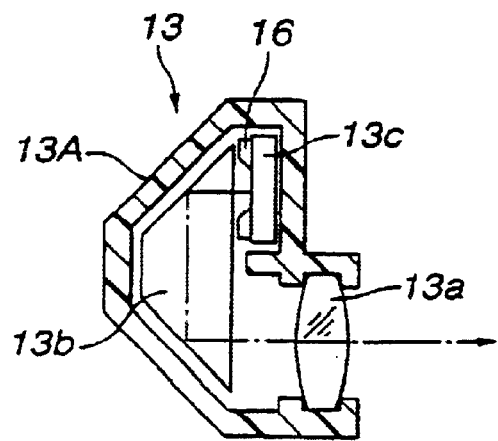
FIG. 4C is a sectional view of the electronic viewfinder unit shown in FIG. 3.
Figure 5:
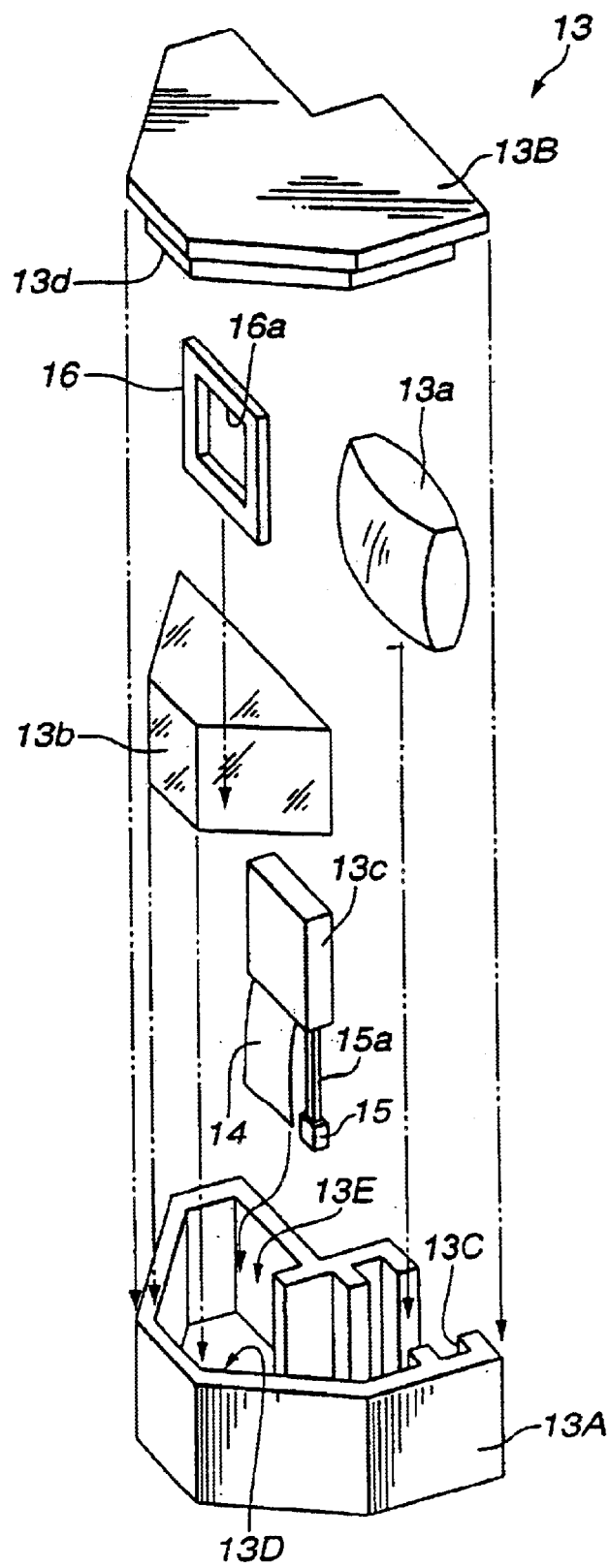
FIG. 5 is an exploded perspective view of the electronic viewfinder unit shown in FIG. 3.
Figure 6:
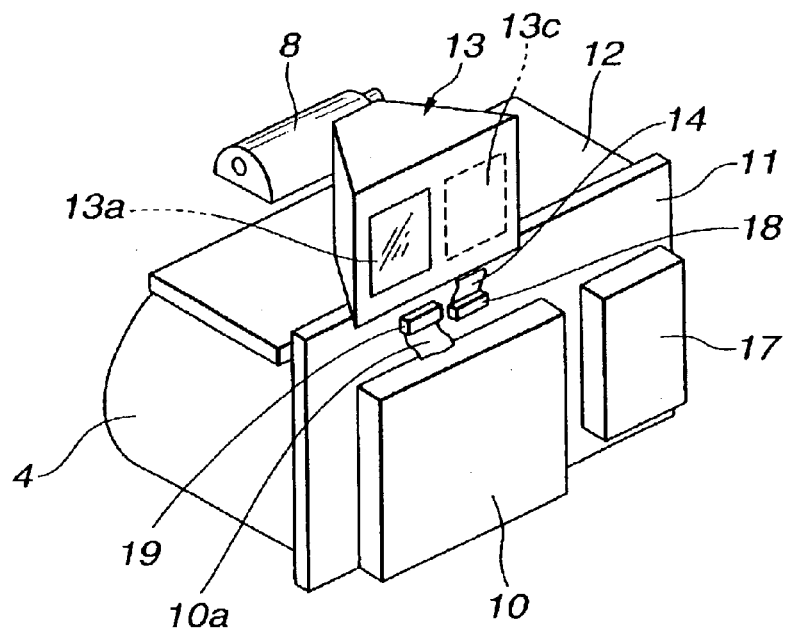
FIG. 6 is a perspective view showing the components of a major portion of the camera shown in FIG. 1A which feature the camera.
Figure 7:
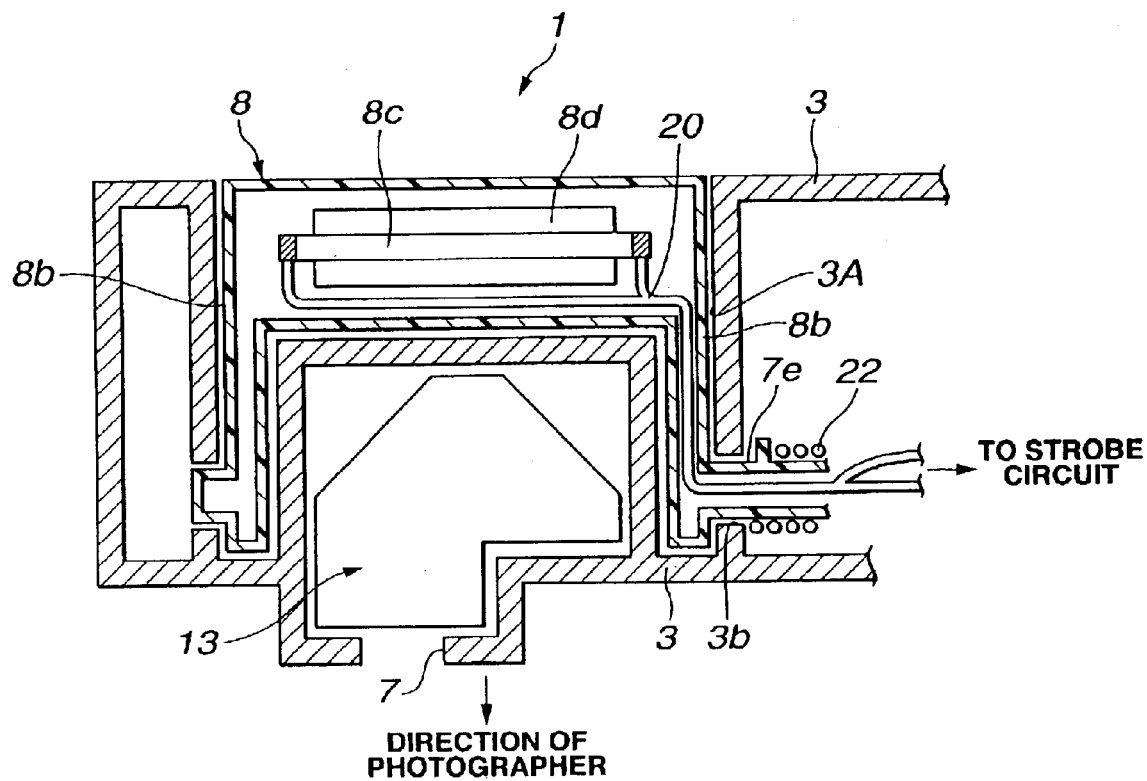
FIG. 7 is a sectional view showing a strobe unit and the electronic viewfinder included in the camera shown in FIG. 1A so as to present the positional relationship between the strobe unit and electronic viewfinder unit.
Figure 8:
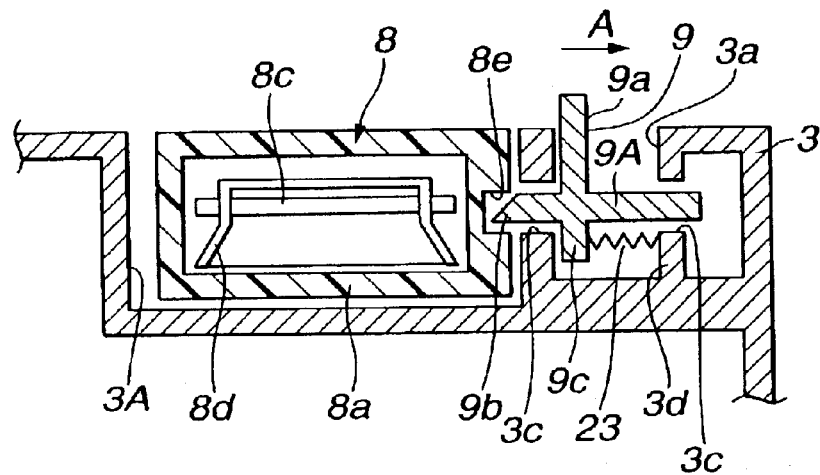
FIG. 8 is a sectional view showing a major portion of mounting structure for the strobe unit employed in the camera shown in FIG. 1A.

FIG. 1A to FIG. 9 are concerned with a camera in accordance with a first embodiment of the present invention. FIG. 1A and FIG. 1B are perspective views showing the appearance of a camera seen from the front. FIG. 1A shows the camera with a strobe unit stored, while FIG. 1B shows the camera with the strobe unit driven. FIG. 2 is a sectional view showing the layout of the components of the camera. FIG. 3 is a sectional view schematically showing the components of an electronic viewfinder unit included in the camera. FIG. 4A is a perspective view showing the appearance of the electronic viewfinder unit. FIG. 4B is a perspective view showing the appearance of the electronic viewfinder unit seen in a direction of arrow A shown in FIG. 3. FIG. 4C is a sectional view of the electronic viewfinder unit. FIG. 5 is an exploded perspective view of the electronic viewfinder unit. FIG. 6 is a perspective view showing the arrangement of the components included in a major portion of the camera. FIG. 7 is a partially sectional view showing a positional relationship between the strobe unit incorporated in the camera and the electronic viewfinder unit. FIG. 8 is a sectional view showing a major portion of mounting structure for the strobe unit.

As shown in FIG. 1A, a camera 1 in accordance with the present embodiment has the outline thereof defined mainly by a camera housing 2. The camera housing 2 includes a camera body armor 3.

A photographic lens 4 enclosed in a lens cover 5 of the camera body armor 3 is located on the face of the camera housing 2. The photographic lens 4 is an optical member that takes in object light and introduces the object light to an imaging device (CCD) that forms an object image. The CCD is incorporated in a camera body.

A release button 6 is located on the top of the camera housing 2. The release button 6 serves as a switching means that is pressed in order to execute photography.

The camera 1 in accordance with the present embodiment includes a retractable strobe unit 8 and an electronic viewfinder unit 13 (see FIG. 2).

The strobe unit 8 irradiates light, which emanates from a light emitting body (an electric discharge tube or the like), to an object during photography so as to provide a satisfactory object exposure. According to the present embodiment, a retractable strobe unit is incorporated in the camera 1.

The strobe unit 8 includes, as shown in FIG. 1B, a light emitting window 8a, and legs 8b extending from both sides of the lower part of a unit body and used to drive the unit body. The strobe unit is located on the front side of the top of the camera housing 2. In this case, the strobe unit 8 has the legs 8b thereof fitted in predetermined places in the camera body armor 3. The strobe unit 8 itself can pivot to be stored in a storage groove 3A formed in the camera body armor 3.

Moreover, a stopper recess 8e is formed in one side surface of the strobe unit 8. A fitting member 9b (see FIG. 8) of a strobe lock button 9, which is located near the storage groove in the camera body armor 3, is fitted in the stopper recess 8e, whereby the strobe unit 8 stored in the storage groove 3A is locked.

The strobe lock button 9 is put in a slide groove 3*a* formed in the camera body armor 3 so that the strobe lock button 9 can slide within the slide groove 3*a*. When the strobe lock button 9 is slid, the fitting member fitted in the stopper recess 8*e* is freed. This causes the strobe unit 8 to turn so that the light emitting window 8*a* faces in the direction of an object. Now, the strobe unit 8 can be driven.

In this state, if a strobe mode is designated, a flashlight reflector 8*d* included in the strobe unit 8 reflects light emanating from the electric discharge tube 8*c* (see FIG. 2) that serves as a light emitting body which emits light while being interlocked with the release button 6. The light is radiated towards an object through the light emitting window 8*a*. The details of the mounting structure for the strobe unit 8 will be described later.

Moreover, an eyepiece window 7 through which the electronic viewfinder unit 13 is looked is formed in the upper part of the back of the camera body armor 3. During photography, a photographer looks through the eyepiece window 7 to view an object image displayed on the electronic viewfinder unit 13 included inside the camera body armor 3.

In the camera 1 of the present embodiment, as mentioned above, the electronic viewfinder unit 13 whose structure features the camera is incorporated in efforts to solve the aforesaid problems. The electronic viewfinder unit 13 acts as the viewfinder of the camera 1.

In the camera 1 of the present embodiment, as shown in FIG. 2, the strobe unit 8 is located on the side of the upper part of the camera body armor 3 facing in the direction of an object. The electronic viewfinder unit 13 is located behind the strobe unit 8 (in the direction of an object).

A TFT panel 10 serving as a first display member on which an object image is displayed is located on the back of the camera body armor 3. The display surface is exposed to the outside through an opening 3B formed in the camera body armor 3.

Consequently, the electronic viewfinder unit 13 and TFT panel 10 are located adjacently to each other on a projection plane near the back of the camera housing 2.

The photographic lens 4 and control circuit board 11 are located adjacently to the TFT panel 10 in the lower part of the inside of the camera body armor 3. The control circuit board 11 is mounted on the rear end of the photographic lens 4. Optical members including the CCD, various electronic parts, and various processing circuits including a signal processing circuit for converting image formation light into a video signal are mounted on the surface of the control circuit board 11.

Furthermore, in the camera 1 of the present embodiment, since the small-sized electronic viewfinder unit 13 is adopted, the strobe unit 8 is located in the direction of an object beyond the electronic viewfinder unit 13. The power circuit board 12 on which various electronic parts are mounted and which is used for strobe lighting can be disposed near and below the strobe unit 8. Namely, as shown in FIG. 2, the power circuit board 12 is interposed between the strobe unit 8 and electronic viewfinder unit 13 and the photographic lens 4.

As mentioned above, since the small-sized electronic viewfinder unit 13 is adopted, the components of the camera 1 can be mounted in the inside of the camera body armor 3 according to a layout like the one shown in FIG. 2 that is preferred for realization of a compact and thin camera.

Next, the components of the electronic viewfinder unit 13 adopted for the camera 1 of the present embodiment will be described with reference to FIG. 2 to FIG. 5.

The electronic viewfinder unit 13 is small-sized and can be disposed in the upper part of the inside of the camera body armor 3 near the back thereof.

The fundamental components of the electric viewfinder unit 13 are: as shown in FIG. 2 and FIG. 3, a unit body 13A; a TFT panel 13*c* electrically connected to the control circuit board 11 and serving as a second display member on which an object image is displayed; an eyepiece 13*a* through which an image displayed on the TFT panel 13*c* is viewed; a prism 13*b* adjoining the TFT panel 13*c* and eyepiece 13*a*, and serving as an optical path conversion member that bends light emitted from an image, which is displayed on the TFT panel 13*c*, by substantially 180° so as to route the light to the eyepiece 13*a*.

The unit body 13A is a storage case shaped like a triangular prism whose corners are cut. As shown in FIG. 3, the eyepiece 13*a* is locked in a surface that contains the longest side of a cross section of the unit body.

Moreover, the TFT panel 13*c* is secured on the internal side of the surface of the unit body 13A having the eyepiece 13*a* locked thereon. The TFT panel 13*c* is electrically connected to the control circuit board 11 via the flexible circuit board 14 (see FIG. 4B) that will be described later.

The prism 13*b* is, for example, an optical member which is made of a plastic, a glass, or an acrylic resin and whose cross section is triangular or trapezoidal. As shown in FIG. 3, the prism 13*b* is disposed so that one plane of the prism will be opposed to the eyepiece 13*a*, and is thus mounted in the unit body 13A.

Fundamentally, the electronic viewfinder unit 13 has the foregoing components. As shown in FIG. 3, light emitted from an image displayed on the TFT panel 13*c* is bent substantially 180° by two planes of the prism 13*b*, and routed to the eyepiece 13*a*. Consequently, the dimension of the electronic viewfinder unit 13 in a thickness direction of the camera is largely reduced. This greatly contributes to realization of a thin camera.

FIG. 4A, FIG. 4B, and FIG. 4C show a practical example of the electronic viewfinder unit exhibiting the foregoing optical property.

As shown in FIG. 4A, the electronic viewfinder unit 13 is designed so that the portion of the unit body 13A on which the eyepiece 13*a* is mounted will project a little in the direction of an object.

Moreover, when the electronic viewfinder unit 13 is seen in a direction of arrow A, the appearance of the electronic viewfinder unit 13 is as shown in FIG. 4B. Specifically, a through hole 13F is bored at a position on the bottom of the unit body 13A opposed to the position of the TFT panel 13*c* secured inside. A lead 15*a* and a linkage flexible circuit board 14 electrically coupled to the TFT panel 13*c* are pulled out of the unit body 13A through the through hole 13F.

The lead 15*a* is a lead over which power is supplied to the backlight of the TFT panel 13*c*. A connector 15 is fixed to the proximal end of the lead 15*a*. The connector 15 is joined to another connector that is not shown and that is formed on the power circuit board 12 (see FIG. 2) located near and below the electronic viewfinder unit 13. Consequently, power is supplied from the power circuit board 12 to the backlight of the TFT panel 13*c*.

Moreover, the linkage flexible circuit board 14 is a linkage member that transmits an image signal to the TFT panel 13*c* or transmits other control signals. As shown in FIG. 6, the linkage flexible circuit board 14 is electrically connected to the control circuit board 11, which is located near and below the electronic viewfinder unit 13, via a connector 18 formed on the control circuit board 11.

The electronic viewfinder unit 13 of this example has, as shown in FIG. 4C, a mask member 16, which helps view a field of view offered by the viewfinder, interposed between the plane of the prism 13b on which light emitted from the TFT panel 13C falls and the display surface of the TFT panel 13c. Consequently, light emitted from the image displayed on the TFT panel 13c is reliably masked by the mask member 16, and then routed to the prism 13b. Consequently, a bright and clear object image can be viewed through the eyepiece 13a to which the light is irradiated through the prism 13b.

Next, the details of the components of the electronic viewfinder unit 13 and a method of manufacturing the electronic viewfinder unit 13 will be described with reference to FIG. 5.

The electronic viewfinder unit 13 adopted for the camera of the present embodiment has, as shown in FIG. 5, specific members stored in a storage groove 13C and storages 13D and 13E which are formed in predetermined places in the unit body 13A. The unit body 13A is then closely capped with a unit lid 13B that blocks the opening of the unit body 13A.

First, the unit body 13A and unit lid 13B are molded through injection molding or the like. In this case, the storage groove 13C in which the eyepiece 13a is stored is formed in the projected portion of the unit body 13A. Moreover, the storage 13D in which the prism 13b is stored is formed at a position opposed to the position of the storage groove 13C. The storage 13E in which the TFT panel 13c and mask member 16 are stored is formed near the storage 13D.

An edge 13d that is engaged with the edge of the opening of the unit body 13A in order to lock the unit lid 13B is formed on the back of the unit lid 13B.

A through hole 13F is, as shown in FIG. 4B, bored in the bottom of the unit body 13A on which the storage 13E is formed.

Next, the eyepiece 13a is fitted in the storage groove 13C formed in the unit body 13A, and secured using an adhesive or the like.

Thereafter, while the TFT panel 13c is fitted in the storage 13E formed in the unit body 13A, the linkage flexible circuit board 14 and the lead 15a having the connector 15 fixed to the distal end thereof are passed through the through hole 13F. Thereafter, the TFT panel 13c is secured using an adhesive or the like.

While the mask member 16 is stacked on the side of the prism 13b facing the TFT panel, the prism is fitted in the storage 13D formed in the unit body 13A and secured using an adhesive or the like.

The assembling procedures are not limited to the foregoing ones. As long as positioning can be achieved highly precisely and work can be simplified, any procedures may be adopted.

After the components are stored in the unit body 13A, the unit lid 13B is engaged with the unit body 13A and secured using an adhesive or the like. Thus, the small-sized electronic viewfinder unit 13 featuring the present embodiment is completed.

Instead of the prism 13b, two mirror members exhibiting the same optical property as the prism may be used as an optical path converting means.

Since the electronic viewfinder unit 13 having the foregoing components is used, as shown in FIG. 6, the arrangement of major components to be mounted in the camera housing 2 of the camera 1 is optimized for realization of a compact and thin camera.

Specifically, as shown in FIG. 6, on the opposite side of the photographic lens 4 other than the side thereof facing in the direction of an object, the control circuit board 11 for controlling display on the TFT panel 10 is located substantially parallel to the back of the camera housing 2. The TFT panel 10 is located near the control circuit board 11. In this case, as illustrated, the flexible circuit board 10a extending from the TFT panel 10 is electrically coupled to the control circuit board 11 via the connector 19.

Moreover, the electronic viewfinder unit 13 is located near and above the control circuit board 11, and electrically connected to the control circuit board 11 via the linkage flexible circuit board 14 and connector 18. Consequently, the connection between the control circuit board 11 and TFT panel 10 and the connection between the control circuit board 11 and electronic viewfinder unit 13 are very short. Therefore, connection work is very simple. This is quite effective in preventing occurrence of a noise.

Furthermore, the power circuit board 12 is located near and above the photographic lens 4. The adoption of the small-sized electronic viewfinder unit 13 leads to a reduction in the dimension of the electronic viewfinder unit 13 in a depth direction. The strobe unit 8 shown in FIG. 2 can be placed in a space created above the power circuit board 12 beyond the electronic viewfinder unit 13 in the direction of an object.

Incidentally, a media receptacle 17 in which a card-like recording medium in which formed image data is recorded, such as, a memory card can be loaded is mounted near the TFT panel 10 on the control circuit board 11.

Moreover, the positional relationship between the electronic viewfinder unit 13 and strobe unit 8 is as shown in FIG. 7. FIG. 7 shows the strobe unit 8 that is stored. As illustrated, the unit body of the strobe unit 8 avoids the electronic viewfinder unit 13. Thus, the small-sized camera body armor 3 is realized.

The structure for mounting the strobe unit 8 on the camera body armor 3 is such that the proximal ends of the legs 8b extending from both sides of the lower part of the strobe unit 8 are fitted in fitting holes 3b, which are bored at predetermined positions in the storage groove 3A in the camera body 3, so that the strobe unit 8 can turn.

Moreover, a driving spring 22 for use in driving or turning the strobe unit 8 upwards is mounted on the bent portion of one of the legs 8b (located near the release button on the camera housing). The driving spring 22 has the proximal end thereof engaged with the bent portion of the leg 8b, and has the other end thereof engaged with an engagement portion (not shown) of the camera armor 3. When the strobe lock button 9 shown in FIG. 1A, FIG. 1B, and FIG. 8 is slid in the direction of arrow A, the strobe unit is freed. The strobe unit 8 can then be driven as shown in FIG. 1B owing to constraining force that causes the strobe unit 8 to turn in an upward direction.

Moreover, a lead 20 over which power is supplied to the electric discharge tube 8c incorporated in the unit body of the strobe unit 8 lies through, as illustrated, the inside of the unit body and one of the legs 8b, and is electrically coupled to the power circuit board 12 on which a strobe circuit that is not shown is realized.

A locking mechanism to be driven with the strobe lock button is such that when the strobe unit is stored as shown in FIG. 8, the fitting member 9b of the strobe lock button 9 is fitted into the stopper recess 8e formed in one side of the strobe unit 8. Thus, the strobe unit 8 stored in the storage groove 3A is locked.

The strobe lock button 9 consists of: a body 9A; an operating member 9a for use in sliding the strobe lock button; the fitting member 9b to be fitted into the stopper recess 8e; and a stopper 9c to which the proximal end of a return spring 23 that constantly constrains the strobe lock button 9 to move towards the strobe unit 8.

The body 9A of the strobe lock button 9 is fitted in a mount hole 3c formed in the camera body armor 3 so that the body 9A can slide. At this time, the operating member 9a jutting out of the top of the camera body armor 3 is fitted in the slide groove 3a, which is formed in the camera body armor 3, so that the operating member 9a can slide.

Moreover, as mentioned above, the proximal end of the return spring 23 is fixed to the stopper 9c that projects from the lower part of the body 9A. The other end of the return spring 23 is fixed to a position near the mount hole 3c in the camera body armor 3. Consequently, the return spring 23 constantly constrains the strobe lock button 9 to move towards the strobe unit 8. The fitted state of the fitting member 9b in the stopper recess 8e can be retained. On the other hand, when the strobe unit is in use, the strobe lock button 9 is slid in a direction of arrow B opposite to the direction of the strobe unit. Consequently, the fitting member 9b fitted in the stopper recess 8e is freed. The strobe unit 8 turns due to the constraining force exerted by the driving spring 22 so that the light emitting window 8a will, as shown in FIG. 1B, face in the direction of an object. Now, the strobe unit 8 can be driven.

As mentioned above, according to the present embodiment, the electronic viewfinder unit 13 is designed as a small-sized unit. Therefore, the strobe unit 8 can be placed in the space created accordingly. Moreover, the major components including the control circuit board 11, power circuit board 12, and TFT panel 10 can be neatly mounted inside the camera body armor 3. Besides, the electric path linking the TFT panel 13c of the electronic viewfinder unit 13 and the control circuit board 11 and the electric path linking the strobe unit 8 and power circuit board 12 can be shortened. Consequently, when the capability of a viewfinder is realized using an electronic viewfinder, a compact and thin camera can be realized at low cost with ease.

Next, a variant of the camera of the first embodiment will be described with reference to FIG. 9.

Figure 9:
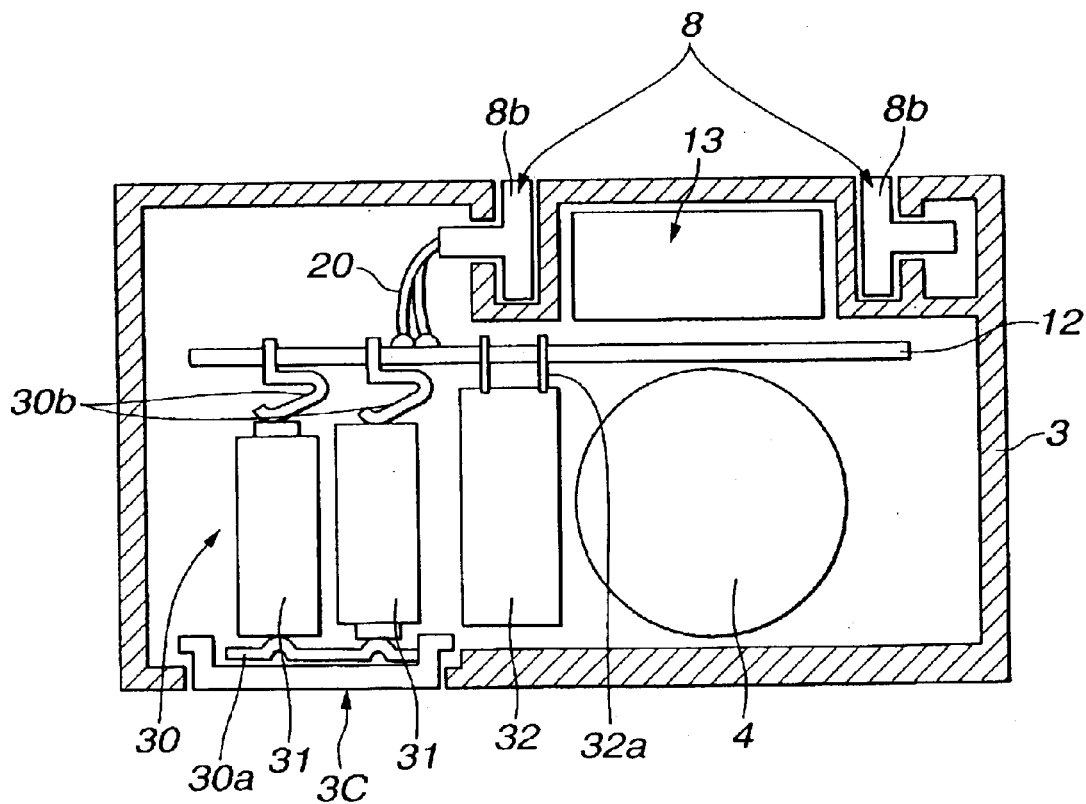
FIG. 9 is a sectional view of a camera in accordance with a variant to which the major portion of the camera shown in FIG. 1A featuring the camera is adapted.

FIG. 9 is a sectional view showing a camera of the variant for the purpose of explaining the camera of the variant in which the feature of the first embodiment is implemented.

A camera 1' of the variant is characterized in that not only the electronic viewfinder unit 13 featuring the camera of the first embodiment and the strobe unit 8 are included but also various power parts including a strobe capacitor 32 and batteries 31 are located with the power circuit board 12 according to a layout preferable for realization of a compact and thin camera.

To be more specific, in the camera 1' of the variant, as shown in FIG. 9, the strobe capacitor 32 in which charge needed to supply power to the strobe unit 8 is stored is mounted on the back of the proximal portion of the power circuit board 12. The power circuit board 12 is located below the electronic viewfinder unit 13 and strobe unit 8. The strobe capacitor 32 is a large component. It is therefore hard to preserve a space, in which the strobe capacitor is placed, while realizing a compact and thin design. In the present variant, the strobe capacitor 32 is interposed between the photographic lens 4 and a battery chamber 30 inside the camera body armor 3. The strobe capacitor 32 is electrically connected to the back of the power circuit board 12 via connection pins 32a. The position of the strobe capacitor 32 is preferable for realization of a compact and thin camera.

Moreover, the battery chamber 30, in which the plurality of batteries 31 needed as a power supply are stored, is located on the opposite side of the inside of the camera body armor 3 other than the side thereof in which the photographic lens 4 is located.

The battery chamber 30 is located in the lower part of the inside of the camera body armor 3. The battery chamber 30 consists of: a battery chamber lid 3C that blocks an opening through which the batteries 31 are stored in the battery chamber 30; a battery contact 30a that comes into contact with the electrodes of the batteries; and battery contacts 30b coupled to the back of the power circuit board 12 and brought into contact with the opposite electrodes of the batteries 31. When the batteries 31 conduct electricity through the battery contacts 30a and 30b, the battery contact 30a is electrically connected to the power circuit board 12. Thus, power fed from the batteries 31 is supplied to a major power circuit realized on the power circuit board 12 by way of the shortest electric path.

Moreover, similarly to the first embodiment, the strobe unit 8 and power circuit board 12 are electrically connected to each other over the lead 20 passed through the leg 8b of the strobe unit 8. The electric path is, as illustrated, the shortest.

Consequently, even the camera 1' of the present variant can be, similarly to the first embodiment, designed compactly and thinly.

Next, a camera in accordance with a second embodiment of the present invention will be described in conjunction with FIG. 10.

Figure 10:
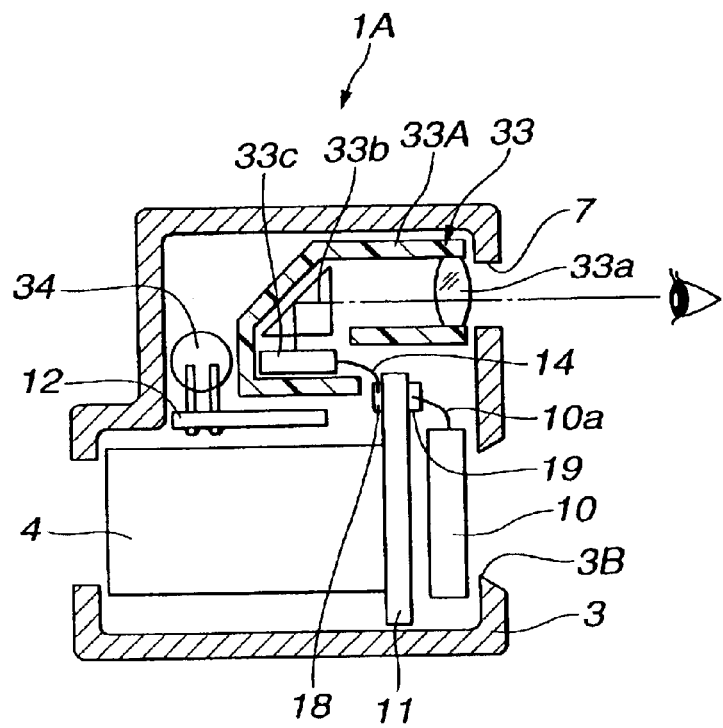
FIG. 10 is a sectional view showing the layout of components of a camera in accordance with a second embodiment of the present invention.

FIG. 10 is a sectional view of the camera in accordance with the second embodiment showing the layout of components of the second embodiment. In FIG. 10, the same reference numerals are assigned to components identical to those of the camera in accordance with the first embodiment. The description of such components will be omitted, and differences alone will be described below.

In the camera 1A of the second embodiment, the optical property of the electronic viewfinder unit 13 is modified. Namely, although the number of times of reflection of image light by the prism 13b in the first embodiment is 2, the number of times of reflection thereof by a prism included in the second embodiment is 1. The image light emitted from a TFT panel is reflected substantially 90° and routed to an eyepiece. Moreover, the relevant circuit boards and TFT panel are arranged adroitly. These are differences from the first embodiment.

The camera 1A of the present embodiment includes, as shown in FIG. 10, an electronic viewfinder unit 33 that has undergone improvements.

The components of the electronic viewfinder unit 33 are substantially identical to those of the electronic viewfinder unit included in the first embodiment. The electronic viewfinder unit 33 has a TFT panel 33c fixed to the bottom of a unit body 33A. Moreover, the electronic viewfinder unit 33 includes a prism 33b exhibiting such an optical property that the prism 33b bends by substantially 90° image display light emitted from the TFT panel 33c through one reflection, and then routes it to an eyepiece 33a.

The prism 33b is, as illustrated, shaped like a triangular prism. The prism 33b reflects image display light, which falls on a plane thereof facing the bottom of the unit body 33A and comes from the TFT panel 33c, substantially 90°, and then routes it to the eyepiece 33a through a plane thereof facing the eyepiece 33a.

Moreover, a through hole is bored in the bottom of the unit body 33A to which the TFT panel 33c is fixed. The linkage flexible circuit board 14 extending from the TFT panel 33c is led out of the unit body 33A through the through hole. The linkage flexible circuit board 14 is coupled to the connector 18 on the control circuit board 11 located near and below the electronic viewfinder unit 33. Thus, the TFT panel 33c and control circuit board 11 can be electrically connected to each other by way of a very short electric path. Similarly to the first embodiment, the TFT panel 10 is located beyond the control circuit board 11. The TFT panel 10 is electrically connected to the control circuit board 11 by way of the flexible circuit board 10a.

The electronic viewfinder unit 33 having the foregoing components exhibits such an optical property that: the prism 33b located in the upper part of the electronic viewfinder unit 33 bends substantially 90° image display light, which is emitted from the TFT panel 33c located on the bottom thereof, and routes the light to the eyepiece 33a located near the back of the camera housing 2. That is to say, an image displayed on the TFT panel 33c becomes visible through the eyepiece 33a after being subjected to one reflection. The visible image is therefore an inverted image. For this reason, according to the present embodiment, a signal processing circuit and others realized on the control circuit board 11 inverts an image to be displayed on the TFT panel 33c in advance. Thus, a normal image that is not an inverted image is visible through the eyepiece 33a.

According to the present invention, since the electronic viewfinder unit 33 having the foregoing components is used, an unoccupied space is created in front of the electronic viewfinder unit 33. The strobe capacitor 34 that is a large electronic component making it hard to realize a compact and thin camera is located in the unoccupied space. In other words, as illustrated, the strobe capacitor 34 is mounted on the surface of the portion of the power circuit board 12, which is located below the electronic viewfinder unit 33, extending in the direction of an object.

Incidentally, as far as the camera 1A of the present embodiment is concerned, a strobe unit is not discussed. The retractable strobe unit 8 included in the first embodiment may be located at a position deviated rightwards or leftwards from the position of the electronic viewfinder unit located on the top of the camera housing. Otherwise, an ordinary embedded type strobe unit may be included inside the camera body armor 3.

The present embodiment includes the electronic viewfinder unit 33 in which image light emitted from the TFT panel 33c is reflected or bent once substantially 90° and routed to the eyepiece 33a. Consequently, an unoccupied space is created inside the camera body armor 3. The strobe capacitor 34 that is a large electronic component can be mounted on the power circuit board 12 within the unoccupied space. Similarly to the first embodiment, the camera can be designed compactly and thinly by adopting a simple structure. Moreover, the prism 33b can be produced more easily than the one included in the first embodiment. The cost of manufacture can thus be lowered. Moreover, the length of the flexible circuit board linking the TFT panel 33c and the control circuit board 11 can be reduced. This is advantageous in preventing noise.

Next, a camera 1B in accordance with a third embodiment of the present invention will be described in conjunction with FIG. 11 and FIG. 12.

Figure 11:
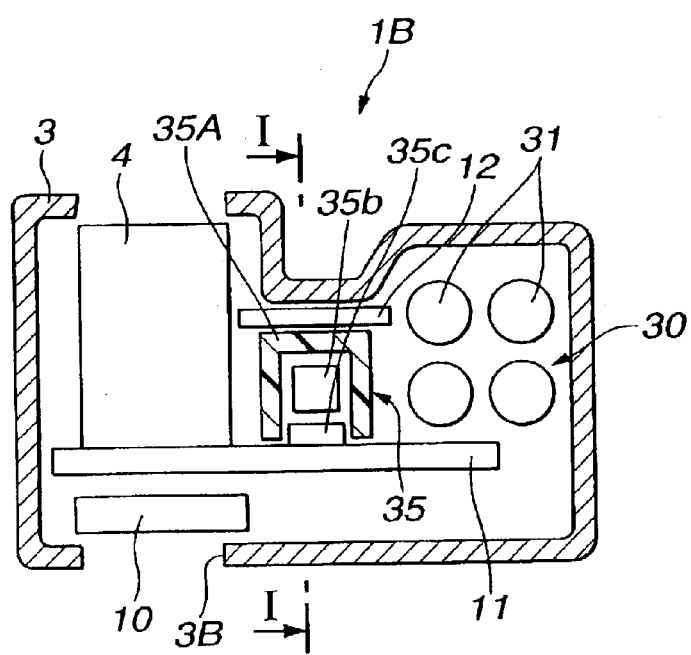
FIG. 11 is a sectional view showing the layout of components of a camera in accordance with a third embodiment of the present invention.
Figure 12:
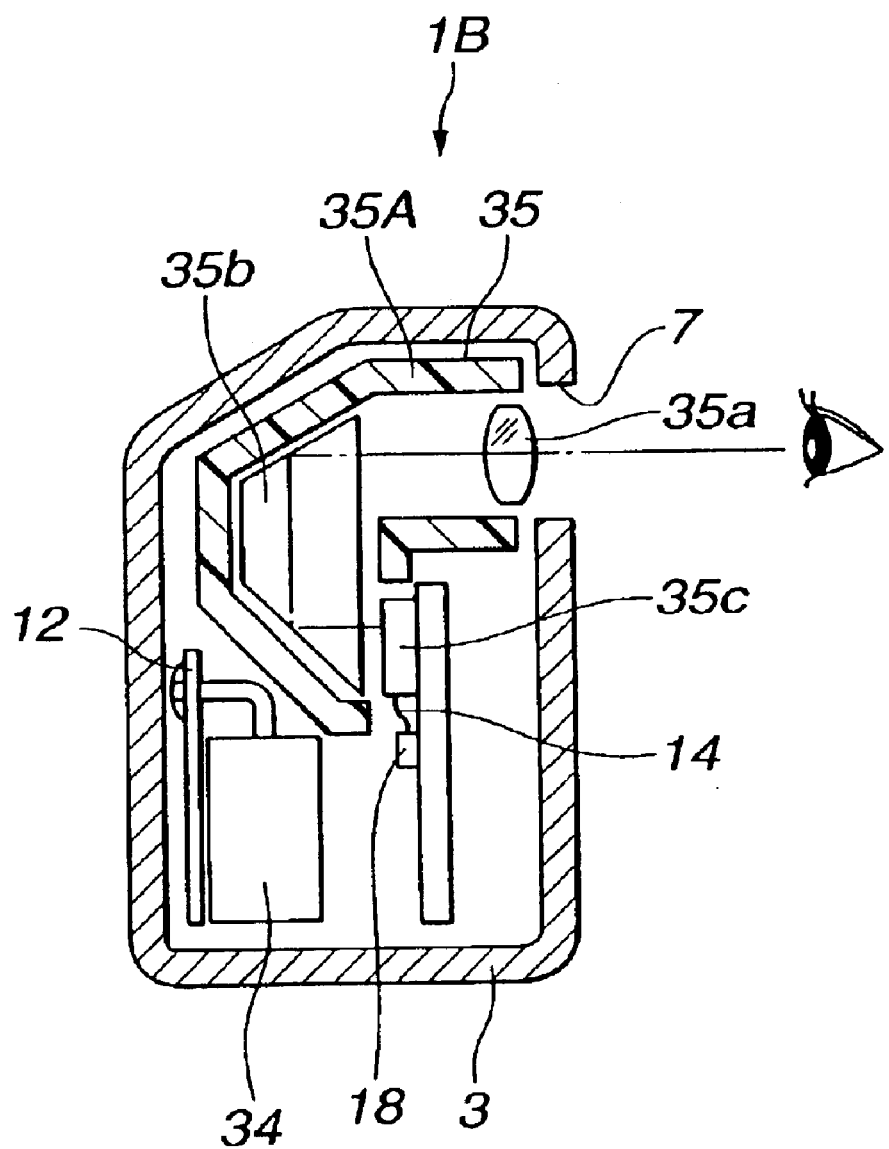
FIG. 12 is an I—I sectional view of the camera shown in FIG. 11.

FIG. 11 and FIG. 12 describe the layout of components featuring the camera in accordance with the third embodiment. FIG. 11 is a sectional view of the camera along a cutting-plane line horizontal to a direction of the optical axis of the photographic lens. FIG. 12 is an I—I sectional view of the camera shown in FIG. 11. In FIG. 11 and FIG. 12, the same reference numerals are assigned to components identical to those of the camera of the first embodiment. The description of the components will be omitted, and differences alone will be described below.

In the camera 1B of the present embodiment, the TFT panel 13c included in the electronic viewfinder unit 13 employed in the first embodiment is mounted and secured on the surface of the control circuit board facing in the direction of an object. Image display light emitted from the TFT panel 13c is bent substantially 180° so that the light will fall on an eyepiece 35a included in an electronic viewfinder unit.

The camera 1B of the present embodiment has, as shown in FIG. 11, the photographic lens 4 located on the left side of the inside of the camera body armor 3. The battery chamber 30 in which four batteries 31 are stored is located on the right side of the inside of the camera body armor 3.

Moreover, the control circuit board 11 is, similarly to the one included in the first embodiment, attached to the proximal end of the photographic lens 4. The control circuit board 11 is located substantially parallel to the TFT panel 10 placed on the back of the camera housing 2.

A TFT panel 35c on which an object image to be viewed is displayed is directly mounted on the center of the surface of the control circuit board 11 facing in the direction of an object. An electronic viewfinder unit 35 is located beyond the TFT panel 35c in the direction of an object so that a unit body 35A will encircle the TFT panel 35c.

Moreover, the power circuit board 12 is interposed between the electronic viewfinder unit 35 and the face of the camera body armor 3.

The components featuring the present embodiment will be further described. As shown in FIG. 12, in the center of the inside of the camera body armor, the electronic viewfinder unit 35 substantially similar to the electronic viewfinder unit 13 included in the first embodiment is located in a vertical direction. The TFT panel 35c is directly mounted on the upper part of the surface of the control circuit board 11 facing in the direction of an object.

In the electronic viewfinder unit 35, the lower part of the unit body 35A has an opening so that image display light emitted from the TFT panel 35c mounted on the control circuit board 11 can be routed to the prism 35b encircled in the unit body 35 through the opening. In this case, the prism 35b bends, similarly to the one included in the first embodiment, substantially 180° the image light emitted from the TFT panel 35c and routes it to the eyepiece 35a.

Owing to the foregoing components, the linkage flexible circuit board 14 by way of which the TFT panel 35c and control circuit board 11 are electrically connected to each other can be made much shorter than the one included in the first or second embodiment. When the TFT panel 35c is directly mounted on the surface of the control circuit board 11, the necessity of the flexible control circuit is obviated.

In the camera 1B of the present embodiment, the electronic viewfinder unit 35 is used and located in the central upper part of the inside of the camera body armor 3. Consequently, an unoccupied space is created below the electronic viewfinder unit 35. According to the present embodiment, the power circuit board 12 is located in front of the lower part of the electronic viewfinder unit 35. The strobe capacitor 34 that is a large electronic component hindering realization of a compact and thin camera is located, similarly to the one included in the second embodiment, in a resultant unoccupied space. In other words, as shown in FIG. 12, the strobe capacitor 34 is mounted on the surface of the power circuit board 12 facing the back of the camera body armor, and is thus interposed between the power circuit board 12 and control circuit board 11.

In the camera 1B of the present embodiment, a strobe unit is not discussed. The retractable strobe unit 8 included in the first embodiment may be located on the top of the side of the camera housing on which the photographic lens 4 or battery chamber 30 is located. Otherwise, an ordinary embedded type strobe unit may be included in the inside of the camera body armor 3 with the other components arranged as mentioned above.

According to the present embodiment, the electronic viewfinder unit 35 has the TFT panel 35c mounted on the control circuit board 11 so that image light emitted from the TFT panel 35c will be bent substantially 180° and routed to the eyepiece 35a. Consequently, the electric path linking the TFT panel and control circuit board is shorter than it is in the first or second embodiments. Thus, reliability is improved. Moreover, a manufacturing process can be simplified and the cost of manufacture can be lowered. Moreover, an unoccupied space can be created inside the camera body armor 3. The strobe capacitor 34 that is a large electronic component can be mounted on the power circuit board 12 within the unoccupied space. Consequently, similarly to the first and second embodiment, the camera can be designed compactly and thinly.

Next, a camera in accordance with a fourth embodiment of the present invention will be described in conjunction with FIG. 13A to FIG. 15B.

Figure 13A:
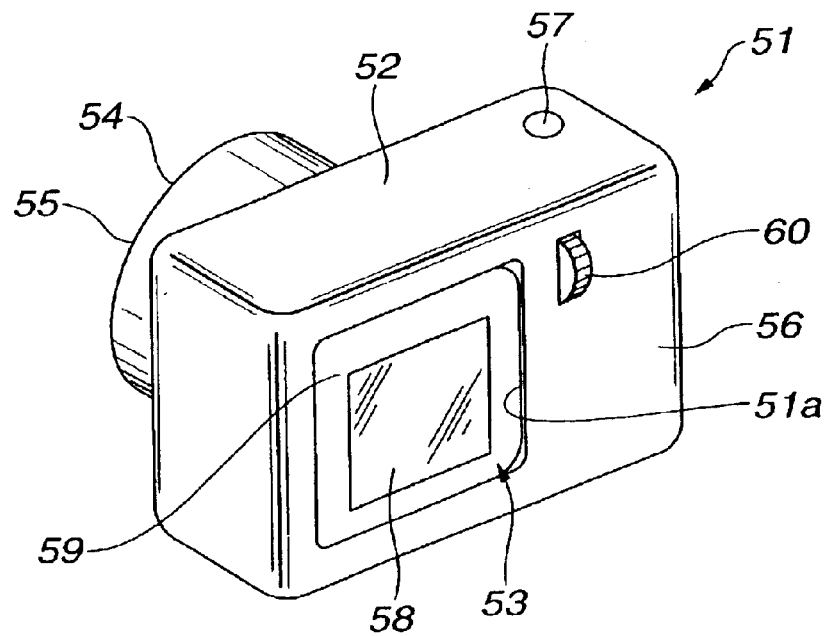
FIG. 13A is a perspective view showing the appearance of a camera in accordance with a fourth embodiment of the present invention which is seen from behind and whose liquid crystal display is stored in a camera body thereof.
Figure 13B:
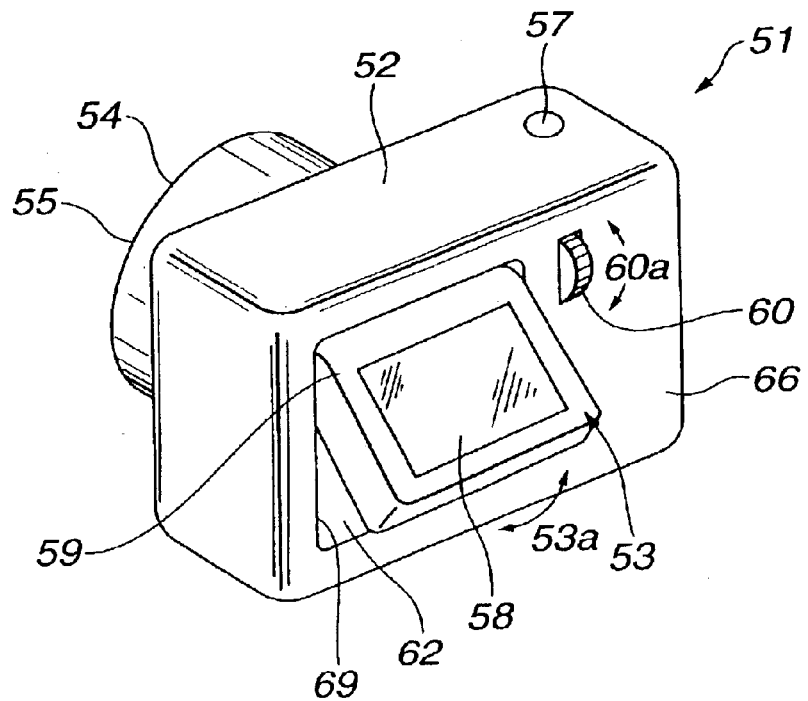
FIG. 13B is a perspective view showing the appearance of the camera in FIG. 13A which is seen from behind and whose liquid crystal display is pulled out of the camera body thereof.
Figure 14A:
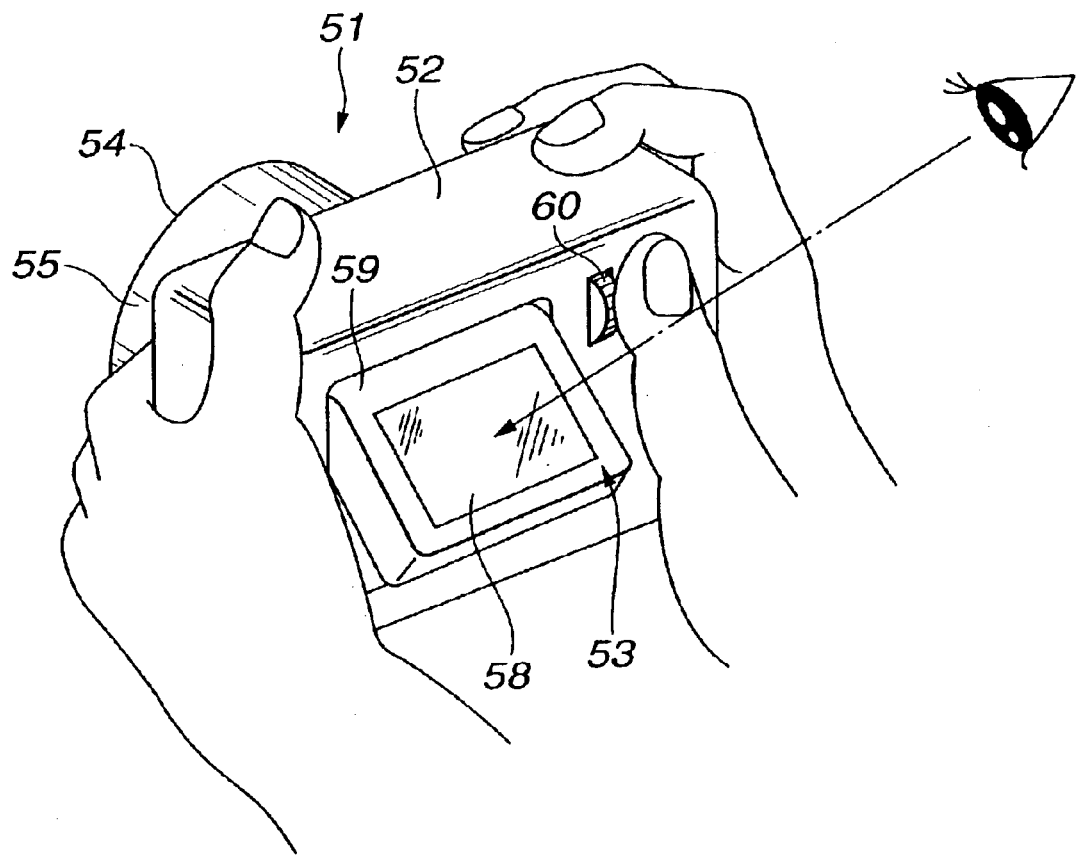
FIG. 14A is a perspective view showing a camera in FIG. 13A in a scene where the liquid crystal display is turned using an operating dial.
Figure 14B:
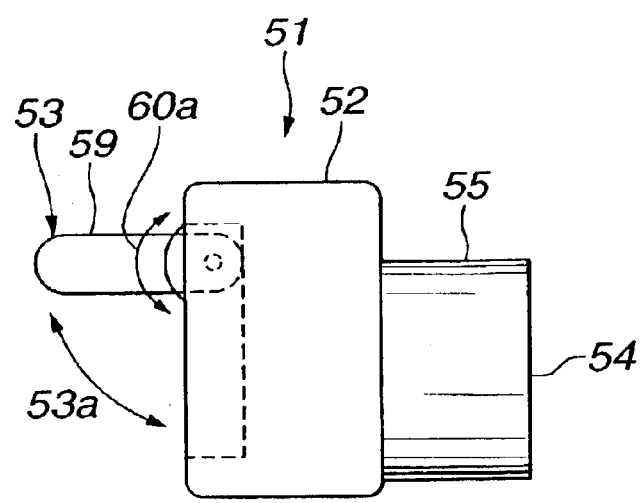
FIG. 14B is a side view of the camera in FIG. 13A showing a turnable range of the liquid crystal display.
Figure 15A:
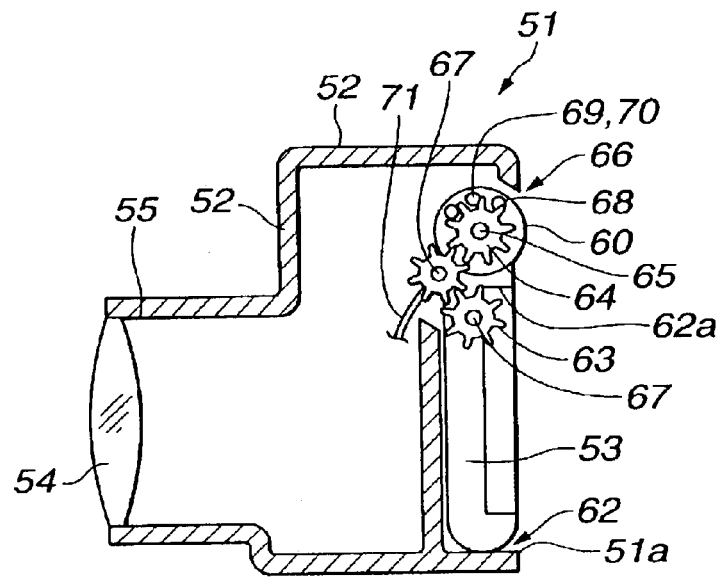
FIG. 15A is a longitudinal sectional view of the camera in FIG. 13A showing a turning mechanism for the liquid crystal display and a conveying mechanism therefor, and is also an exploded perspective view of the liquid crystal display.
Figure 15B:
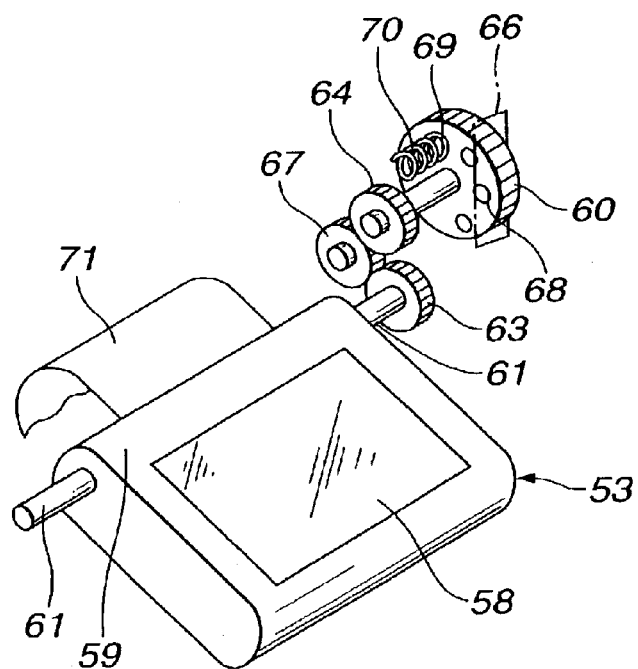
FIG. 15B is an exploded perspective view showing the liquid crystal display included in the camera shown in FIG. 13A.

FIG. 13A and FIG. 13B are perspective views showing the appearance of the camera in accordance with the fourth embodiment that is seen from behind. FIG. 13A shows the camera with a liquid crystal display stored in a camera body. FIG. 13B shows the camera with the liquid crystal display pulled out of the camera body. FIG. 14A is a perspective view showing the camera shown in FIG. 13A in a scene where the liquid crystal display is turned using an operating dial. FIG. 14B is a side view of the camera showing a turnable range of the liquid crystal display. Furthermore, FIG. 15A is a longitudinal sectional view of the camera showing a turning mechanism for the liquid crystal display, a conveying mechanism, and their surroundings. FIG. 15B is an exploded perspective view of the liquid crystal display.

As shown in FIG. 13A, a camera 51 of the present embodiment consists mainly of a camera body armor 52 and a liquid crystal display 53 to be pulled out of the back of the camera body armor 52.

The camera body armor 52 outlines the body of the camera 51. A lens barrel 55 including a photographic lens 54 is located on the face of the camera body armor 52. A grip portion 56 by which a photographer holds the camera is formed on the right side of the camera body armor 52 near a release button 57.

The release switch 57 is located on the top of the camera body armor 52. The release button 57 is a switching means that is pressed in order to execute photography.

Moreover, an electronic circuit board that is not shown and others are stored inside the camera body armor 52.

The liquid crystal display 53 consists of, as shown in FIG. 13B, a liquid crystal panel (TFT) 58 in which a TFT technology is implemented and which serves as a display means and a liquid crystal holder 59 including a turn interlocking mechanism for turning the liquid crystal display relative to the camera body armor 52.

The liquid crystal display 53 is stored in a liquid crystal display storage 62 formed along the back of the camera body armor 52. The liquid crystal display storage 62 has an opening 51a. The opening 51a is substantially flush with the display screen of the TFT panel 58 of the liquid crystal display 53 to be stored.

An operating dial 60 that is an operating member included in the turn interlocking mechanism for turning the liquid crystal display 53 is located on the back of the grip portion 56 of the camera. The details of the operating dial 60 will be described later.

The camera 51 of the present embodiment is characterized in that the liquid crystal display 53 is not directly turned while being held with hands but the operating dial 60 is included in the grip portion 56 so that the operating dial can be handled with the camera 51 held with hands.

Specifically, when the liquid crystal display 53 is set to the state shown in FIG. 13A, an angle of visibility at which an image displayed on the TFT panel 58 used as a viewfinder is visible may not be attained during photography. In this case, the liquid crystal display 53 must be turned as shown in FIG. 14A and FIG. 14B. Since the operating dial 60 is located within easy reach of a finger with the camera 51 held with both hands, the camera offers improved maneuverability.

Next, the turn interlocking mechanism for the liquid crystal display 53 will be described with reference to FIG. 15A and FIG. 15B.

The liquid crystal display 53 has a shaft member 61 jutted out of the upper edges of both sides of the liquid crystal holder 59. Both ends of the shaft member 61 are borne by the camera body armor 52 so that the shaft member 61 can turn. Thus, the liquid crystal display 53 is stored in the liquid crystal display storage 62 formed along the back of the camera body.

Moreover, a driving gear 63 is fixed to the end of the shaft member 61 located in the grip portion 56.

On the other hand, the operating dial 60 has a rotation shaft 65 that extends parallel to the shaft member 61 and has a driving gear 64 fixed to the end thereof located near the liquid crystal display 53. The operating dial 60 is borne by the camera body armor 52 so that it can turn. Part of the operating dial 60 is exposed to outside through an opening 66 formed in the camera body armor 52.

The driving gear 63 and driving gear 64 are interlocked with each other while being meshed with an interlocking gear 67 linking the driving gear 63 and driving gear 64. Consequently, torque exerted by the operating dial 60 is conveyed to the shaft member 61 via the driving gear 64, interlocking gear 67, and driving gear 63 respectively. Thus, the liquid crystal display 53 is turned.

Spherical dents 68 are formed equidistantly and concentrically in a side surface of the operating dial 60. A click ball 69 that is a clicking means and can project into each dent 68 is thrust by a spring 70 borne parallel to the rotation shaft 65, whereby a resistance is given to rotation of the rotation shaft 65 and a sense of clicking is given to a user.

Moreover, a flexible circuit board 71 electrically coupled to the TFT panel 58 so that the liquid crystal display 53 can turn is led to an electronic circuit board that is not shown and that is stored inside the camera body armor 52.

Next, movements featuring the camera 51 of the present embodiment will be described below.

Assume that the camera 51 of the present embodiment is used to perform photography. In this case, normally, a photographer holds the camera 51 with his/her both hands or one hand, and orients the camera in the direction of an object. Since the camera 51 of the present embodiment includes the turn interlocking mechanism for turning the liquid crystal display 53, even when the camera 51 is held, the operating dial 60 interlocked with the liquid crystal display 53 can be turned in a direction of an arrow 60a (FIG. 13B).

Specifically, when the operating dial 60 is turned, the turn of the operating dial 60 is conveyed among the driving gear 64, interlocking gear 67, and driving gear 63 that are, as shown in FIG. 15B, meshed with one another. Consequently, the liquid crystal display 53 is turned on the shaft member 61 in a direction of an arrow determined with an angle 53a(FIG. 13B and FIG. 14B).

At this time, the liquid crystal display 53 undergoes a slide resistance exerted by the click ball 69. Since the click ball 69 is entrapped into the dents 68, the angle of rotation 53a (see FIG. 13B and FIG. 14B) can be adjusted or locked stepwise. A desired angle of visibility at which an image displayed on the liquid crystal display is visible can be maintained stepwise.

Moreover, the display surface (of the TFT panel 58) of the liquid crystal display 53 can be, as shown in FIG. 13A, turned by 90° from an initial state or a first state in which the display surface is parallel to the back of the camera body (a position in a normal photographic state) through a second state in which the display surface is tilted relative to the back to a state in which the display surface meets the wall 62a of the storage at right angles.

Consequently, according to the present embodiment, the angle of visibility at which an image displayed on the liquid crystal display 53 is visible can be adjusted to an easy-to-see angle with the camera held with both hands or one hand.

In the present embodiment, the shaft member 61 penetrates through the upper edge of the liquid crystal display 53, and the liquid crystal display is turned so that the TFT panel will face upwards. Alternatively, a mechanism similar to the one including the operating dial 60 and shaft member 61 may be included along the lower edge of the liquid crystal display 53. The liquid crystal display may then be turned so that the TFT panel will face downwards. Moreover, the position of the operating dial 60 may be found on the lens barrel 55 so that the operating dial can be handled with a left hand, with which the lens barrel 55 is supported, with the camera held both hands.

Next, a camera in accordance with a fifth embodiment of the present invention will be described in conjunction with FIG. 16A to FIG. 19B.

Figure 16A:
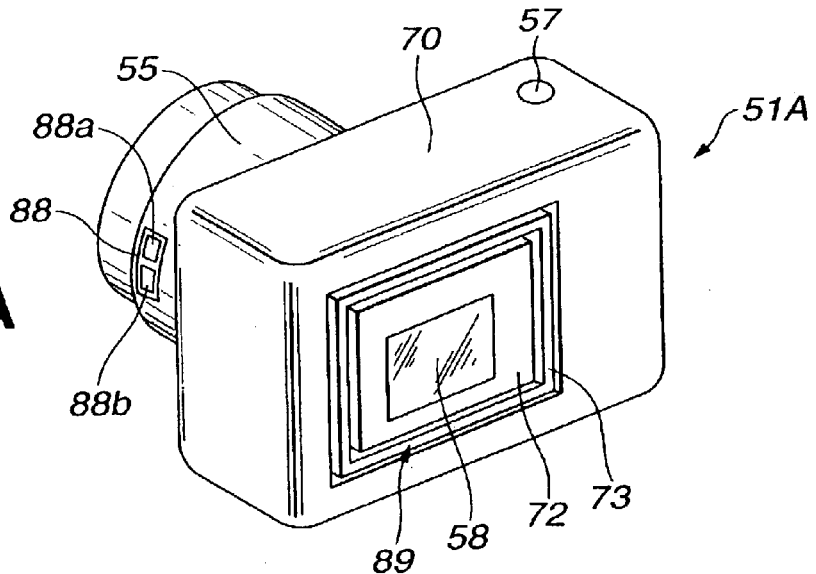
FIG. 16A is a perspective view showing the appearance of a camera in accordance with a fifth embodiment of the present invention which is seen from behind and which is set to a normal photographic state.
Figure 16B:
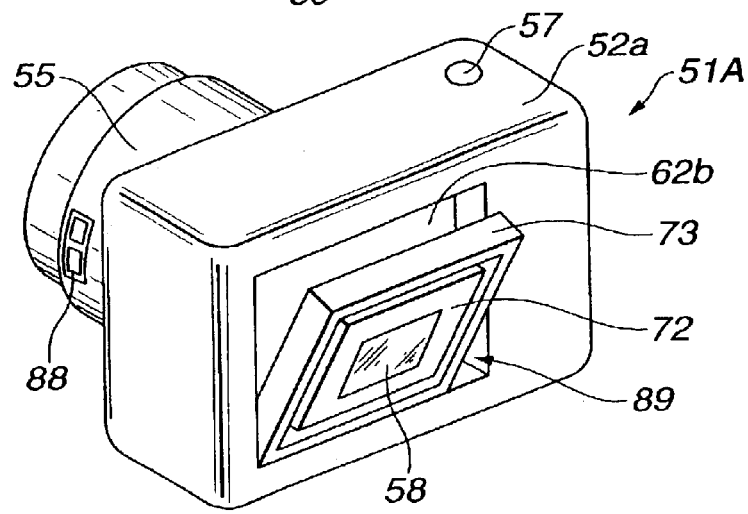
FIG. 16B is a perspective view showing the appearance of the camera in FIG. 16A which is seen from behind and which is set to a high-angle photographic state.
Figure 16C:
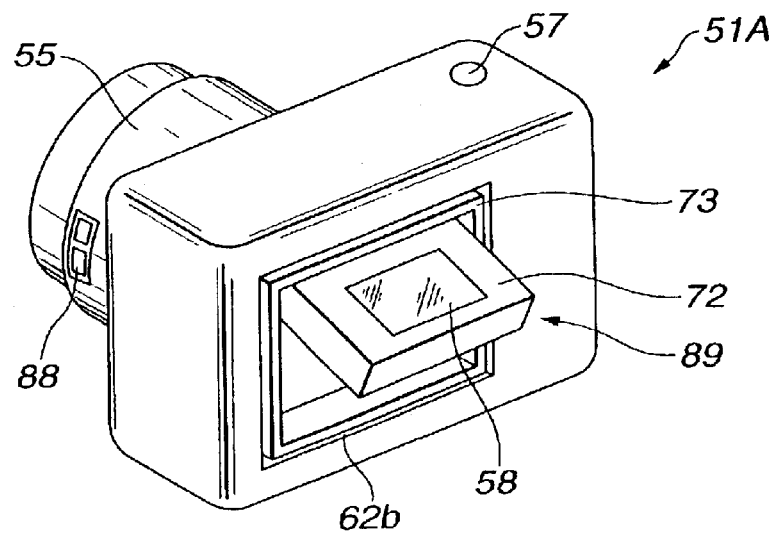
FIG. 16C is a perspective view showing the appearance of the camera in FIG. 16A which is seen from behind and which is set to a low-angle photographic state.
Figure 17:
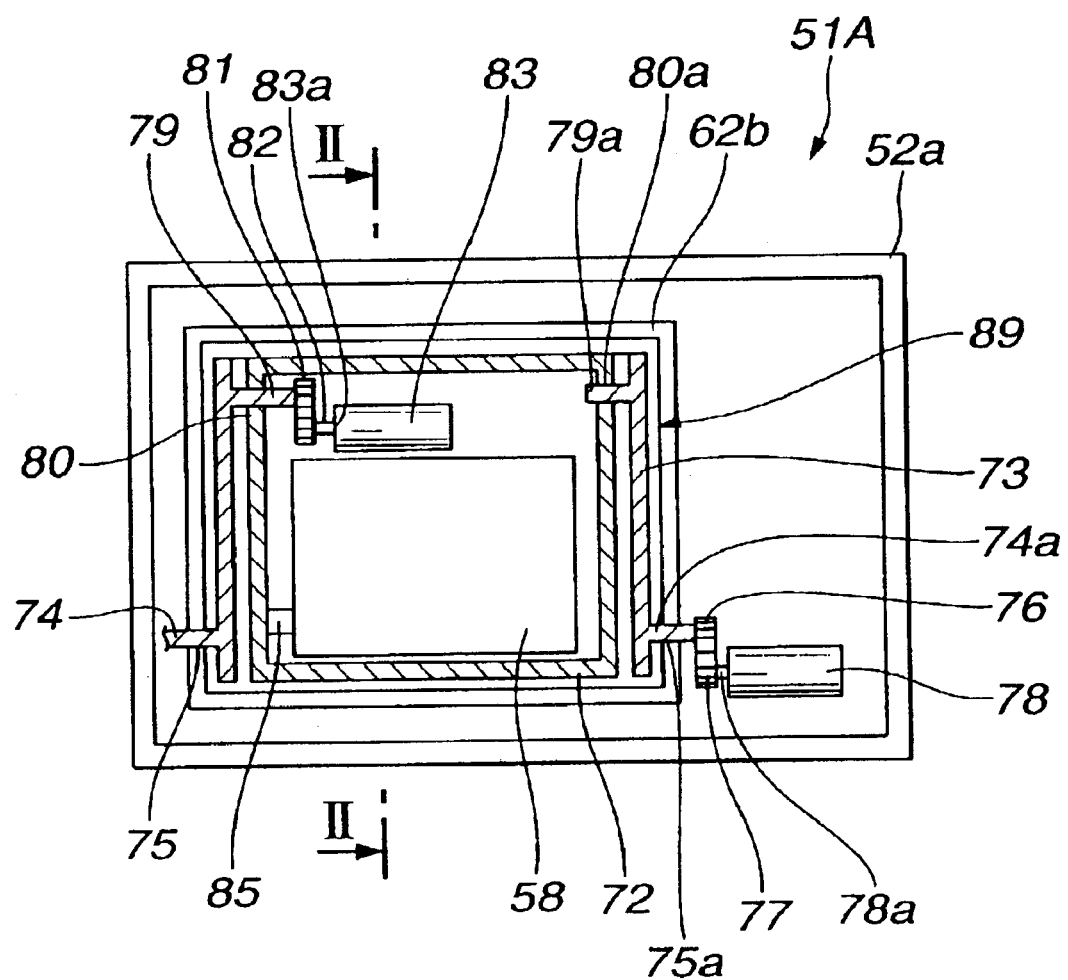
FIG. 17 is a sectional view of the camera in FIG. 16A, which is seen from behind, showing a two-shaft turning liquid crystal display and a two-shaft turning mechanism.
Figure 18A:
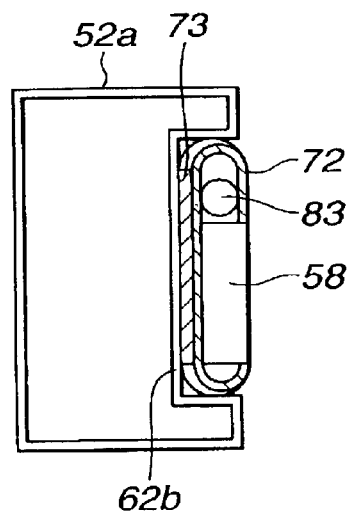
FIG. 18A is a sectional view of the camera shown in FIG. 16A along a II—II cutting plane shown in FIG. 17 showing the camera in the normal photographic state.
Figure 18B:
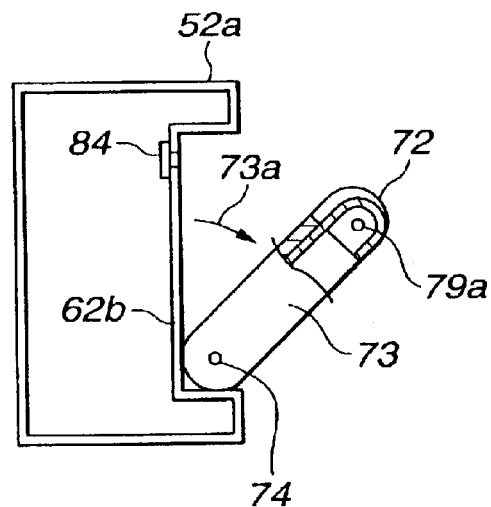
FIG. 18B is a sectional view of the camera shown in FIG. 16A along the II—II cutting plane shown in FIG. 17 showing the camera in the high-angle photographic state.
Figure 18C:
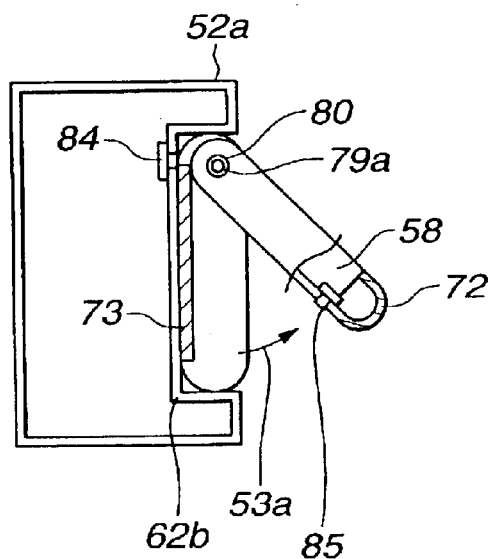
FIG. 18C is a sectional view of the camera shown in FIG. 16A along the II—II cutting plane shown in FIG. 17 showing the camera in the low-angle photographic state.
Figure 18D:
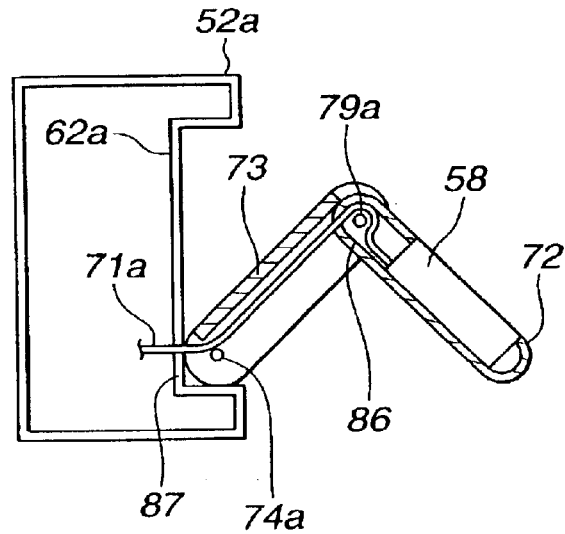
FIG. 18D is a sectional view of the camera shown in FIG. 16A along the II—II cutting plane shown in FIG. 17 showing the position of a flexible printed-circuit board with an inner liquid crystal display frame turned from the state shown in FIG. 18B.
Figure 19A:
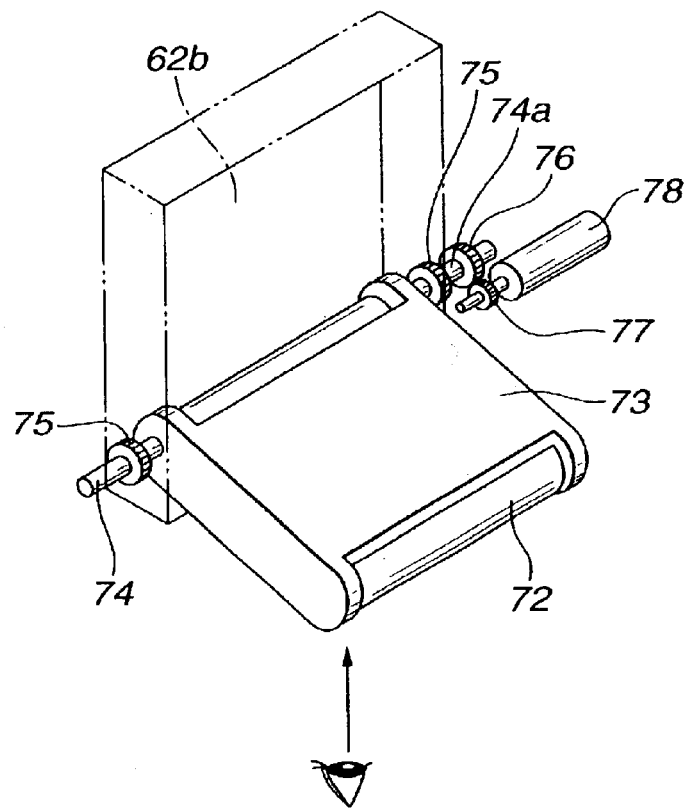
FIG. 19A is a perspective view showing the liquid crystal display, which is included in the camera shown in FIG. 16A and seen through, with the camera set to the high-angle photographic state.
Figure 19B:
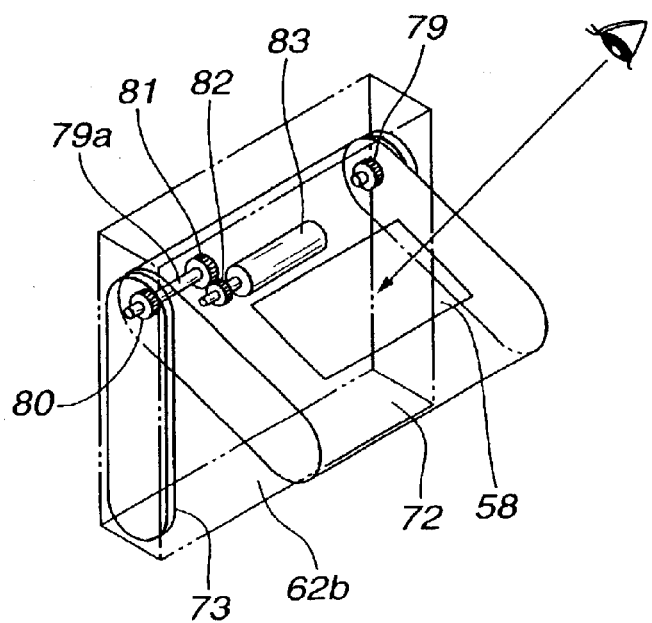
FIG. 19B is a perspective view showing the liquid crystal display, which is included in the camera shown in FIG. 16A and seen through, with the camera set to the low-angle state.
Figure 20:
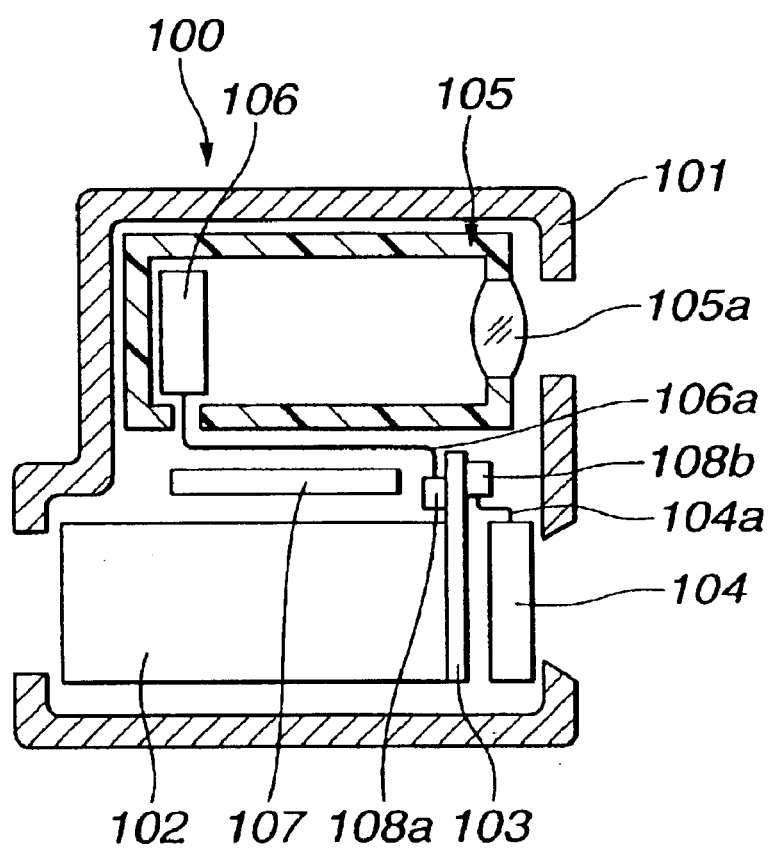
FIG. 20 is a sectional view of a conventional camera including an electronic viewfinder.

FIG. 16A, FIG. 16B, and FIG. 16C are perspective views showing the appearance of a camera that is seen from behind in respective photographic states. FIG. 16A shows the camera in a normal photographic state. FIG. 16B shows the camera in a high-angle photographic state. FIG. 16C shows the camera in a low-angle photographic state. Moreover, FIG. 17 is a longitudinal sectional view showing a TFT panel included in the camera, a TFT turning mechanism, and their surroundings which are seen from behind the camera. FIG. 18A, FIG. 18B, FIG. 18C, and FIG. 18D are sectional views along a II—II cutting-plane line shown in FIG. 17, showing a two-shaft turning liquid crystal display included in the camera in respective turned states. FIG. 18A shows the section in the normal photographic state. FIG. 18B shows the section in the high-angle photographic state. FIG. 18C shows the section in the low-angle photographic state. FIG. 18D shows the section in a state in which an inner liquid crystal display frame is turned from the state shown in FIG. 18B, wherein a flexible printed-circuit board serving as a connection for the TFT panel 58 is shown. FIG. 19A and FIG. 19B are perspective views showing the liquid crystal display, which is included in the camera and seen through, in the respective photographic states. FIG. 19A shows the liquid crystal display in the high-angle photographic state. FIG. 19B shows the liquid crystal display in the low-angle photographic state.

The overall configuration of the camera 51A in accordance with the present embodiment is substantially identical to that of the camera 51 in accordance with the fourth embodiment. However, a parallel two-shaft turning mechanism is adopted as a turning mechanism for turning a liquid crystal display 89 that includes the TFT panel 58. Moreover, an operating button member 88 equivalent to the operating dial 60 is located on the lens barrel 55. The turn of a two-shaft turning type liquid crystal display 89 is motor-driven. The liquid crystal display can be turned in both vertical directions.

To be more specific, the camera 51A of the present embodiment has, as shown in FIG. 16A, FIG. 16B, and FIG. 16C, as the operating button member 88 that is an operating member, two operating buttons that are an upper operating button member 88a and a lower operating button member 88b located up and down on the lens barrel 55. Assume that the two-shaft turning liquid crystal display 89 is brought to a normal state that is a first state shown in FIG. 16A by means of a turning/driving mechanism that will be described later. Specifically, the two-shaft turning liquid crystal display 89 is brought to a state in which the display surface of the TFT panel 58 is parallel to the back of the camera body armor 52a. In this state, if the lower operating button member 88b is pressed, the display surface of the TFT panel 58 tilts downwards together with an outer liquid crystal display frame 73. Consequently, the liquid crystal display is brought to a high-angle photographic state that is a second state shown in FIG. 16B. In this state, if the upper operating button member 88a is pressed, the liquid crystal display is returned to the normal state shown in FIG. 16A.

Likewise, in the camera 51A, when the two-shaft turning liquid crystal display 89 is in the normal state, if the upper operating button member 88a is pressed, the display surface of the TFT panel 58 tilts upwards together with an inner liquid crystal display frame 72. Consequently, the liquid crystal display 89 is brought to a low-angle photographic state that is a second state shown in FIG. 16C. In this state, if the lower operating button member 88b is pressed, the liquid crystal display is returned to the normal state shown in FIG. 16A.

As mentioned above, in the camera 51A of the present embodiment, unlike the camera 51 of the fourth embodiment, the display surface of the TFT panel 58 tilts in both vertical directions.

When the camera 51A of the present embodiment is seen from behind, it appears as shown in FIG. 16A. As shown in FIG. 16A, the camera 51A of the present embodiment has the operating button member 88 located at a predetermined position on the lateral surface of the lens barrel 5 of the camera body armor 2a. More particularly, the operating button member 88 is positioned within a range within which a finger of a left hand, with which the lens barrel 55 is supported, with the camera 51A held can reach and handle the operating button member 88.

The operating button member 88 is, similarly to the operating dial 60 included in the first embodiment, an operating means for use in instructing turning of the TFT panel 58. The operating button member 88 includes the operating buttons that are pressed in order to turn on or off turning switches.

Next, concrete structures of the TFT panel 58 and two-shaft turning mechanism will be described with reference to FIG. 17 to FIG. 19A and FIG. 19B.

As shown in FIG. 17, the TFT panel 58 serving as a display means is placed inside the inner liquid crystal display frame 72. The inner liquid crystal display frame 72 is placed inside the outer liquid crystal display frame 73. Thus, the two-shaft turning liquid crystal display 89 is completed. The two-shaft turning liquid crystal display 89 is, similarly to the one included in the fourth embodiment, stored in a storage 62b formed along the back of the camera body armor 52a.

The two-shaft turning liquid crystal display 89 including the TFT panel 58, inner liquid crystal display frame 72, and outer liquid crystal display frame 73 is borne by rotation shafts 74 and 79 so that it can turn. The rotation shafts 74 and 79 are connected to rotation motors 78 and 83, which drive and turn the rotation shafts, via driving gears 76, 77, 81, and 82.

The rotation shafts 74 and 74a are jutted out of both sides of the lower part of the outer liquid crystal display frame 73. The rotation shaft 74 is borne by a bearing 75 formed in the storage inside the camera body armor 52a, and the rotation shaft 74a is borne by a bearing 75a formed in the storage inside the camera body armor 52a. Thus, the outer liquid crystal display frame 73 is borne so that it can turn on the rotation shafts 74 and 74a.

The rotation shaft 74a is borne while being penetrated through the bearing 75a. The driving gear 76 is fixed to the tip of the rotation shaft 74a, and meshed with the driving gear 77 attached to a rotation shaft 78a of the rotation motor 78 fixed to the camera body armor 52a.

Furthermore, the outer liquid crystal display frame 73 has the rotation shafts 79 and 79a projected inwards from both sides of the upper part thereof. The rotation shaft 79 is borne by a bearing 80 formed on the inner liquid crystal display frame 72, and the rotation shaft 79a is borne by a bearing 80a formed on the inner liquid crystal display frame 72. Thus, the outer liquid crystal display frame 73 is borne so that it can turn on the rotation shafts 79 and 79a.

Likewise, the driving gear 81 is fixed to the tip of the rotation shaft 79, and meshed with the driving gear 82 attached to a rotation shaft 83a of the rotation motor 83 fixed to the inner liquid crystal display frame 72.

When the operating button member 88 is pressed, whichever of the outer liquid crystal display frame 73 and inner liquid crystal display frame 72 should be turned must be determined. For this purpose, in the present embodiment, two detection switches 84 and 85 are included for judging whether the outer liquid crystal display frame 73 and inner liquid crystal display frame 72 are open or closed.

The detection switch 84 is used to detect whether the outer liquid crystal display frame 73 is open or closed. The detection switch 84 is located in the upper part of the storage 62b and separated from the rotation shaft 74 located on the lower edge of the outer liquid crystal display frame 73. Moreover, the detection switch 85 is used to detect whether the inner liquid crystal display frame 72 is open or closed. The detection switch 85 is located on the lower edge of the inner liquid crystal display frame 72 and separated from the rotation shaft 79 located on the upper edge of the outer liquid crystal display frame 73. The detection switches 84 and 85 produce, for example, an on-state or off-state signal as information from which it is judged whether the outer liquid crystal display frame 73 or inner liquid crystal display frame 72 is open or closed.

Moreover, flexible circuit boards 71a electrically coupled to, as shown in FIG. 18D, the TFT panel 58, the rotation motor 78 or 83, and the detection switch 84 or 85 are passed through openings 86 and 87, which are formed near the rotation shafts 79 and 74, and then coupled to an electronic circuit board that is not shown (incorporated in the camera body). The flexible circuit boards 71a are coupled to the electronic circuit board so that the two-shaft turning liquid crystal display 89 can turn.

Next, movements made in the camera 51A of the present embodiment will be described with reference to FIG. 16A, FIG. 16B, FIG. 16C, FIG. 18A, FIG. 18B, FIG. 18C, FIG. 18D, FIG. 19A, and FIG. 19B. FIG. 16A and FIG. 18A, FIG. 16B and FIG. 18B, and FIG. 16C and FIG. 18 show the same turned states of the two-shaft turning liquid crystal display 89.

Assume that the camera 51A of the present embodiment is used to perform photography. In this case, a photographer holds the camera 51A in the same manner as the camera of the fourth embodiment, and presses the operating button member 88 while supporting the lens barrel 55. With the handling of the operation button member 88, an operation signal is transmitted to the electronic circuit board that is not shown. Based on the operation signal, the electronic circuit board drives and controls the two-shaft turning mechanism so as to turn the TFT panel 58 to a position associated with the handling.

At this time, the switches 84 and 85 are used to transmit information, which represents whether the outer liquid crystal display frame 73 and inner liquid crystal display frame 72 are open or closed, to the electronic circuit board. Based on the received information, the electronic circuit board controls actions as listed in Table 1. Namely, a driving signal is transmitted to the rotation motors 78 and 83, and driving of the rotation motors 78 and 83 is controlled based on the driving signal.

Table 1 lists examples of control actions to be performed on the motors depending on the states of the detection switches 84 and 85 and the settings of the upper and lower operation buttons 88a and 88b constituting the operation button member 88. Referring to Table 1, when the outer liquid crystal display frame 73 is open, the detection switch 84 is off and off-state information is transmitted to the electronic circuit board. When the outer liquid crystal display frame 73 is closed, the detection switch 84 is on and on-state information is transmitted to the electronic circuit board. Likewise, when the inner liquid crystal display frame 72 is open, the detection switch 85 is off and off-state information is transmitted to the electronic circuit board. When the inner liquid crystal display frame 72 is closed, the detection switch 85 is on and on-state information is transmitted to the electronic circuit board.

TABLE 1

| Operation mode | Detection switch 84 | Detection switch 85 | Setting of upper operation button 88a | Setting of lower operation button 88b |
|---|---|---|---|---|
| 1 | ON | ON | Motor 83 for opening (Open in low-angle state) | Motor 78 for opening (Open in high-angle state) |
| 2 | OFF | ON | Motor 78 for closing (Closed in high-angle state) | Motor 78 for opening (Open in high-angle state) |
| 3 | ON | OFF | Motor 83 for opening (Open in low-angle state) | Motor 83 for closing (Closed in low-angle state) |
| 4 | OFF | OFF | Motor 78 and motor 83 for closing (normal state) | |

Notes) When the liquid crystal display is open, the detection switch is off. When the liquid crystal display is closed, the detection switch is on.

For example, in operation mode 1, as described in Table 1, when both the detection switches 84 and 85 are on, if the upper operation button 88a is handled, control is given from the electronic circuit board in order to drive the motor 83 in a direction permitting the inner liquid crystal display frame 72 to open. Consequently, the TFT panel 58 changes from the state shown in FIG. 16A to the low-angle photographic state shown in FIG. 16C.

In the same operation mode 1, when both the detection switches 84 and 85 are on, if the lower operation button 88b is handled, control is given from the electronic circuit board in order to drive the motor 78 in a direction permitting the outer liquid crystal display frame 73 to open. Consequently, the TFT panel 58 changes from the state shown in FIG. 16A to the high-angle photographic state shown in FIG. 16B.

In operation mode 2, as described in Table 1, assume that the detection switch 84 is off and the detection switch 85 is on, and that the upper operation button 88a is handled. Since the TFT panel 58 is already set to the high-angle photographic state shown in FIG. 16B, control is given from the electronic circuit board in order to drive the motor 78 in a direction permitting the outer liquid crystal display frame 73 to close. Consequently, the TFT panel 58 changes from the state shown in FIG. 16B to the normal state shown in FIG. 16A. Moreover, in the operation mode 2, when the detection switch 84 is off and the detection switch 85 is on, if the lower operation button 88b is handled, control is given from the electronic circuit board in order to drive the motor 78 in a direction permitting the outer liquid crystal display frame 73 to open. Consequently, the TFT panel 58 in the state shown in FIG. 16B causes the outer liquid crystal display frame 73 to turn. The angle of rotation 73a is adjusted.

Moreover, in operation mode 3, as described in Table 1, assume that the detection switch 84 is on and the detection switch 85 is off, and that the operation button 88a is handled. In this case, since the TFT panel 58 is already set to the low-angle photographic state shown in FIG. 16C, control is given from the electronic circuit board in order to drive the motor 83 in a direction permitting the outer liquid crystal display frame 72 to open. Consequently, the TFT panel 58 in the state shown in FIG. 16C causes the inner liquid crystal display frame 72 to turn. The angle of rotation 53a is adjusted. Moreover, in the operation mode 3, when the detection switch 84 is on and the detection switch 85 is off, if the operation button 88b is handled, control is given from the electronic circuit board in order to drive the motor 78 in a direction permitting the outer liquid crystal display frame 73 to close. Consequently, the TFT panel 58 returns to the state shown in FIG. 16A.

Furthermore, in operation mode 4, as described in Table 1, when both the detection switches 84 and 85 are off, if the upper operation button 88a or lower operation button 88b is handled, control is given from the electronic circuit board in order to drive the motors 78 and 83 in directions permitting the outer liquid crystal display frame 73 and inner liquid crystal display frame 72 to close. Consequently, the TFT panel 58 returns to the normal state shown in FIG. 16A.

In the above operation modes, when the motor 78 is driven to rotate, the outer liquid crystal display frame 73 is turned with the rotation shaft 74 as a center via the driving gear 77 and driving gear 76. Likewise, when the motor 83 is driven to rotate, the inner liquid crystal display frame 72 is turned with the rotation shaft 79 as a center via the driving gear 82 and driving gear 81.

Incidentally, the angle of rotation by which the TFT panel 58 is turned is adjusted by adjusting the angle of rotation 53a for the inner liquid crystal display frame 72 or the angle of rotation 73a for the outer liquid crystal display frame 73. The adjustment of the angle of rotation is controlled within the electronic circuit board depending on the time during which the operation button 88 is held down.

Owing to the foregoing control, the inner liquid crystal display frame 72 or outer liquid crystal display frame 73 is turned vertically from the initial state in which the frame is parallel to the back of the camera body to any angular position of up to 90°. Thus, the visibility of an image displayed on the TFT panel 58 can be improved.

Consequently, the camera 51A of the present embodiment provides the same advantages as those of the fourth embodiment. Moreover, since the TFT panel 58 is included in the liquid crystal display having the two-shaft rotation mechanism, an angle of opening or closing by which the TFT 58 is opened or closed can be varied vertically. The visibility of an image displayed on the TFT panel 58 can be further improved. Furthermore, since the operation dial 60 to be handled manually is replaced with the operation button member 88 that is used to trigger motor-driven turning, a tremble of the camera body occurring during handling can be alleviated. Photography that is little affected by a tremble can be achieved while the display surface of the TFT panel 58 is moved.

The present invention is not limited to the first to fifth embodiments. The present invention can be implemented in an application of any of these embodiments or a combination thereof.

As described so far, according to the present invention, there is provided a camera capable of being designed compactly and thinly by adopting a simple structure. Furthermore, an operating member is interlocked with a turning mechanism for a liquid crystal display, can be handled with the camera held with hands, and is located on the surface of a camera body. By handling the operating member, high-angle or low-angle photography or photography to be performed with a composition of a picture varied can be achieved with the camera held with both hands and with the optimal visibility ensured for an image displayed on the liquid crystal display.

What is claimed is:

1. A camera having an electronic viewfinder unit, said camera comprising:

a camera housing having a back and a front;

a display member for the electronic viewfinder unit having a display surface provided substantially in parallel to the back of the camera housing, on which an image of an object is displayed based on an image signal obtained by an imaging device;

an eyepiece opposed to the back of said camera housing and used to view the image displayed on said display member; and an optical path conversion member having both a light inlet side and a light outlet side opposed to the back of said camera housing, wherein the inlet side is opposite to said display member and the outlet side is opposite to said eyepiece, and wherein said optical path conversion member lets in light emitted from the image displayed on said display member from the inlet side, bends the light by substantially 180°, and then lets out the light from the outlet side into said eyepiece.

2. A camera according to claim 1, wherein said display member and said eyepiece adjoin each other on a projection plane opposed to the back of said camera housing.

3. A camera according to claim 1, wherein the optical path conversion member comprises one of: (i) two mirrors and (ii) a sole prism.

4. A camera comprising:

a camera housing having a back and a front;

a display member on which an image of an object is displayed;

an eyepiece opposed to the back of the camera housing and used to view the image displayed on the display member; and an optical path conversion member adjoining the display member and the eyepiece, and bending light emitted from the image displayed on the display member by substantially 180° so as to route the light to the eyepiece;

wherein the optical path conversion member comprises two mirrors; and wherein a camera component is placed in a space created between backs of the mirrors and a bottom portion of the camera housing.

5. A camera comprising:

a camera housing having a back and a front;

a display member on which an image of an object is displayed;

an eyepiece opposed to the back of the camera housing and used to view the image displayed on the display member; and an optical path conversion member adjoining the display member and the eyepiece, and bending light emitted from the image displayed on the display member by substantially 180° so as to route the light to the eyepiece;

wherein the optical path conversion member comprises a sole prism; and wherein a camera component is placed in a space created between an inclined plane of the prism and a bottom portion of the camera housing.

6. A camera according to claim 1, further comprising a circuit board permitting control of display on said display member, wherein said circuit board is located substantially parallel to the back of said camera housing, and said display member and said circuit board are connected to each other.

7. A camera comprising:

a camera housing having a back and a front;

a display member on which an image of an object is displayed;

an eyepiece opposed to the back of the camera housing and used to view the image displayed on the display member;

an optical path conversion member adjoining the display member and the eyepiece, and bending light emitted from the image displayed on the display member by substantially 180° so as to route the light to the eyepiece; and a second display member, on which an image of an object is displayed, located on the back of the camera housing.

8. A camera according to claim 7, wherein said second display member is one of: (i) directly mounted on a circuit board and (ii) connected to said circuit board by way of a connection member.

9. A camera according to claim 7, wherein said display member and said second display member are located on a face and a back of a circuit board, respectively.

10. A camera according to claim 7, wherein said display member and said second display member are located on a same side of a circuit board.

11. A camera comprising:

a display on which an image represented by object light coming through a photographic lens is displayed and which is selectively movable between a first state in which said display is located substantially parallel to a back of said camera and a second state in which said display is tilted with respect to the substantially parallel state;

an operating member operable on an outer surface of the camera separately from the movable display for use in selecting said first state and said second state as a position of display, wherein said operating member is located at a position at which said operating member can be handled while said camera is held; and an interlocking mechanism for driving said display to a desired position in accordance with an operation of said operating member.

12. A camera according to claim 11, wherein in said second state, said display is set at an angle with respect to said first state in accordance with an amount of operation of the operating member.

13. A camera according to claim 11, wherein said operating member is located on a grip portion of said camera.

14. A camera comprising:

a display on which an image represented by object light coming through a photographic lens is displayed and which is selectively movable between a first state in which said display is located substantially parallel to a back of said camera and a second state in which said display is tilted with respect to the substantially parallel state; and an operating member for use in selecting said first state and said second state;

wherein said operating member is located at a position at which said operating member can be handled while said camera is held;

wherein said operating member is located on a grip portion of said camera; and wherein said operating member is located on a back of said grip portion of said camera.

15. A camera according to claim 11, wherein said operating member comprises a turn operating dial adapted to set said display at an angle with respect to said first state in accordance with an amount of turning of said turn operating dial.

16. A camera comprising:

a display on which an image represented by object light coming through a photographic lens is displayed and which is selectively movable between a first state in which said display is located substantially parallel to a back of said camera and a second state in which said display is tilted with respect to the substantially parallel state; and an operating member for use in selecting said first state and said second state;

wherein said operating member is located at a position at which said operating member can be handled while said camera is held;

wherein said operating member is located on a lens barrel of said camera.

17. A camera according to claim 11, further comprising a motor which drives said display via said interlocking mechanism in accordance with the operation of said operating member.

* * * * *